(12) United States Patent
Rust et al.

(10) Patent No.: US 10,990,553 B2
(45) Date of Patent: *Apr. 27, 2021

(54) ENHANCED SSD STORAGE DEVICE FORM FACTORS

(71) Applicant: Liqid Inc., Broomfield, CO (US)

(72) Inventors: Brenden Michael Rust, Loveland, CO (US); Christopher R. Long, Colorado Springs, CO (US); Andrew Rudolph Heyd, Longmont, CO (US); Sumit Puri, Calabasas, CA (US); Bryan Schramm, Lafayette, CO (US); Seth Walsh, Superior, CO (US); Jason Breakstone, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,827

(22) Filed: Apr. 8, 2019

(65) Prior Publication Data
US 2019/0236044 A1    Aug. 1, 2019

Related U.S. Application Data

(63) Continuation of application No. 15/418,094, filed on Jan. 27, 2017, now Pat. No. 10,255,215.
(Continued)

(51) Int. Cl.
G06F 13/40    (2006.01)
G06F 13/16    (2006.01)
(Continued)

(52) U.S. Cl.
CPC ......... *G06F 13/4022* (2013.01); *G06F 1/187* (2013.01); *G06F 11/2015* (2013.01);
(Continued)

(58) Field of Classification Search
None
See application file for complete search history.

(56) References Cited

U.S. PATENT DOCUMENTS 5,828,207 A    10/1998  Saadeh
6,043,984 A     3/2000  Tseng
(Continued)

FOREIGN PATENT DOCUMENTS

WO    2015126383 A1    8/2015

OTHER PUBLICATIONS

Addonics Technologies, Inc., Datasheet for "2.5" U.2 M2 PCIe/NVMe SSD Drive," 2 pages, May 31, 2016.
(Continued)

*Primary Examiner* — Henry Tsai
*Assistant Examiner* — Christopher A Bartels

(57) ABSTRACT

Enhanced data storage devices in various form factors are discussed herein. In one example, a storage drive includes a 2.5-inch form factor chassis that structurally supports elements of the storage drive, and at least one host connector. The storage drive also includes a plurality of M.2 storage device connectors, and a Peripheral Component Interconnect Express (PCIe) switch circuit configured to receive storage operations over the at least one host connector and transfer the storage operations for delivery to ones of the plurality of M.2 storage device connectors over associated device PCIe interfaces. The storage drive also includes power circuitry configured to provide holdup power to ones of the plurality of M.2 storage device connectors after loss of input power over the at least one host connector.

20 Claims, 16 Drawing Sheets

Related U.S. Application Data

(60) Provisional application No. 62/288,937, filed on Jan. 29, 2016.

(51) Int. Cl.
*G06F 13/42* (2006.01)
*G06F 1/18* (2006.01)
*G06F 11/20* (2006.01)
*G06F 1/30* (2006.01)

(52) U.S. Cl.
CPC .......... *G06F 13/16* (2013.01); *G06F 13/4068* (2013.01); *G06F 13/4282* (2013.01); *G06F 1/30* (2013.01); *G06F 2213/0026* (2013.01)

(56) References Cited

U.S. PATENT DOCUMENTS

| | | | |
|---|---|---|---|
| 6,061,750 | A | 5/2000 | Beardsley et al. |
| 6,325,636 | B1 | 12/2001 | Hipp et al. |
| 7,243,145 | B1 | 7/2007 | Poortman |
| 7,260,487 | B2 | 8/2007 | Brey et al. |
| 7,505,889 | B2 | 3/2009 | Salmonsen et al. |
| 7,606,960 | B2 | 10/2009 | Munguia |
| 7,725,757 | B2 | 5/2010 | Padweka et al. |
| 7,877,542 | B2 | 1/2011 | Chow et al. |
| 8,125,919 | B1 | 2/2012 | Khanka et al. |
| 8,150,800 | B2 | 4/2012 | Webman et al. |
| 8,656,117 | B1 | 2/2014 | Wong et al. |
| 8,688,926 | B2 | 4/2014 | Breakstone et al. |
| 8,799,702 | B2 | 8/2014 | Buckland et al. |
| 8,850,091 | B1* | 9/2014 | Karamcheti ........ G06F 12/0246 710/62 |
| 8,880,765 | B2* | 11/2014 | Melvin, Jr. ......... H02J 13/0075 340/870.03 |
| 8,880,771 | B2 | 11/2014 | Subramaniyan et al. |
| 9,602,437 | B1 | 3/2017 | Bernath |
| 9,619,848 | B2* | 4/2017 | de Castro ............ H02J 3/1821 |
| 2002/0059428 | A1 | 5/2002 | Susai et al. |
| 2003/0110423 | A1 | 6/2003 | Helms et al. |
| 2003/0126478 | A1 | 7/2003 | Burns et al. |
| 2004/0156151 | A1* | 8/2004 | Morrow ................ G06F 1/266 361/18 |
| 2005/0223136 | A1 | 10/2005 | Tanaka et al. |
| 2006/0277206 | A1 | 12/2006 | Bailey et al. |
| 2007/0067432 | A1 | 3/2007 | Tarui et al. |
| 2008/0034153 | A1 | 2/2008 | Lee et al. |
| 2008/0198744 | A1 | 8/2008 | Menth |
| 2008/0281938 | A1 | 11/2008 | Rai et al. |
| 2009/0006837 | A1 | 1/2009 | Rothman et al. |
| 2009/0100280 | A1 | 4/2009 | Lindsay |
| 2009/0190427 | A1 | 7/2009 | Brittain et al. |
| 2009/0193201 | A1 | 7/2009 | Brittain et al. |
| 2009/0193203 | A1 | 7/2009 | Brittain et al. |
| 2009/0276551 | A1 | 11/2009 | Brown et al. |
| 2010/0088467 | A1 | 4/2010 | Lee et al. |
| 2010/0153621 | A1* | 6/2010 | Kreiner ................ G06F 3/0607 711/103 |
| 2011/0289510 | A1 | 11/2011 | Lin et al. |
| 2011/0299317 | A1 | 12/2011 | Shaeffer et al. |
| 2011/0320861 | A1 | 12/2011 | Bayer et al. |
| 2012/0030544 | A1 | 2/2012 | Fisher-Jeffes |
| 2012/0089854 | A1 | 4/2012 | Breakstone et al. |
| 2012/0151118 | A1 | 6/2012 | Flynn et al. |
| 2012/0166699 | A1 | 6/2012 | Kumar et al. |
| 2012/0210163 | A1 | 8/2012 | Cho |
| 2012/0317433 | A1 | 12/2012 | Ellis et al. |
| 2013/0024595 | A1 | 1/2013 | Subramaniyan et al. |
| 2013/0132643 | A1 | 5/2013 | Huang |
| 2013/0185416 | A1 | 7/2013 | Larkin et al. |
| 2014/0047166 | A1 | 2/2014 | Asnaashari et al. |
| 2014/0056319 | A1 | 2/2014 | Hellwig |
| 2014/0059265 | A1 | 2/2014 | Iyer et al. |
| 2014/0075235 | A1 | 3/2014 | Chandhoke et al. |
| 2014/0103955 | A1 | 4/2014 | Avritch et al. |
| 2014/0108846 | A1 | 4/2014 | Berke et al. |
| 2014/0365714 | A1 | 12/2014 | Sweere et al. |
| 2015/0074322 | A1 | 3/2015 | Galles |
| 2015/0121115 | A1 | 4/2015 | Chandra et al. |
| 2015/0162068 | A1* | 6/2015 | Woo ................ G11C 11/40615 365/222 |
| 2015/0186437 | A1 | 7/2015 | Molaro |
| 2015/0212755 | A1 | 7/2015 | Asnaashari |
| 2015/0277512 | A1 | 10/2015 | Davis et al. |
| 2015/0304423 | A1 | 10/2015 | Satoyama et al. |
| 2015/0309951 | A1 | 10/2015 | Breakstone et al. |
| 2015/0355686 | A1 | 12/2015 | Heyd et al. |
| 2015/0370665 | A1 | 12/2015 | Cannata et al. |
| 2015/0373115 | A1 | 12/2015 | Breakstone et al. |
| 2016/0073544 | A1 | 3/2016 | Heyd et al. |
| 2016/0104522 | A1* | 4/2016 | Son ........................ G11C 11/005 711/103 |
| 2016/0154765 | A1 | 6/2016 | Shin |
| 2016/0197996 | A1 | 7/2016 | Barton et al. |
| 2016/0248631 | A1 | 8/2016 | Duchesneau |
| 2016/0259754 | A1 | 9/2016 | Ping |
| 2017/0164501 | A1 | 6/2017 | Killen et al. |
| 2017/0220505 | A1 | 8/2017 | Breakstone et al. |
| 2017/0262029 | A1 | 9/2017 | Nelson et al. |
| 2017/0269871 | A1 | 9/2017 | Khan et al. |
| 2017/0308325 | A1* | 10/2017 | Pearson ................ G06F 3/0613 |
| 2017/0315873 | A1* | 11/2017 | Alcorn ................ G06F 13/1694 |
| 2017/0322605 | A1* | 11/2017 | Potter ..................... G06F 1/187 |
| 2018/0034374 | A1* | 2/2018 | Breen ................... H02M 3/158 |

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.

International Application No. PCT/US2017/046602, International Search Report & Written Opinion, 8 pages, dated Oct. 19, 2017.

International Application No. PCT/US2017/046607, International Search Report & Written Opinion, 7 pages, dated Oct. 23, 2017.

International Application No. PCT/US2017/055490, International Search Report & Written Opinion, 11 pages, dated Feb. 7, 2018.

Lu, Yingping et al., "Performance Study Of iSCSI-Based Storage Subsystems," IEEE Communications Magazine, pp. 76-82, Aug. 2003.

* cited by examiner

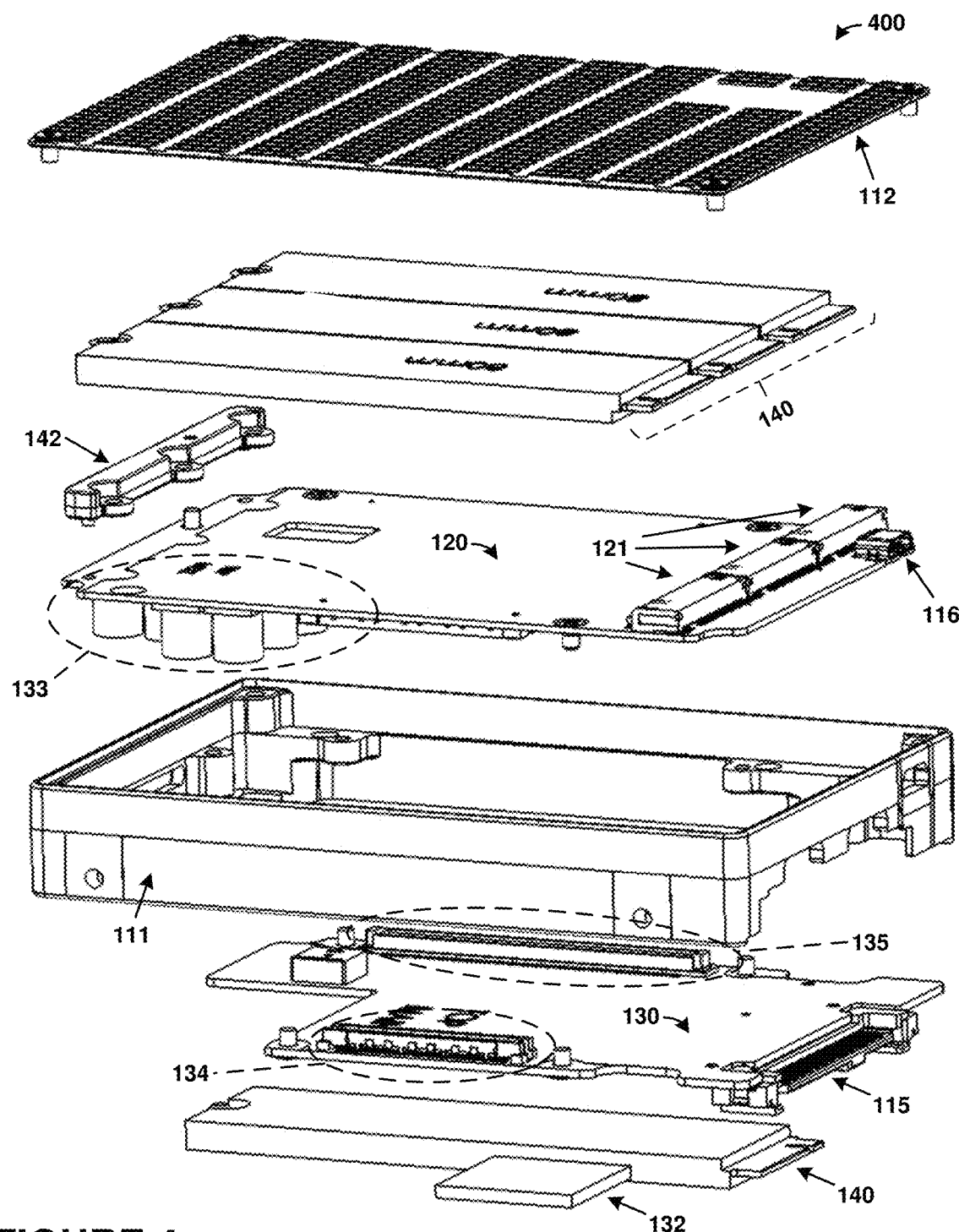
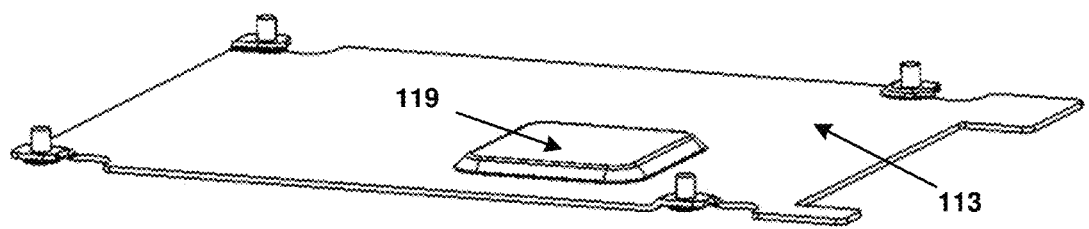
FIGURE 4

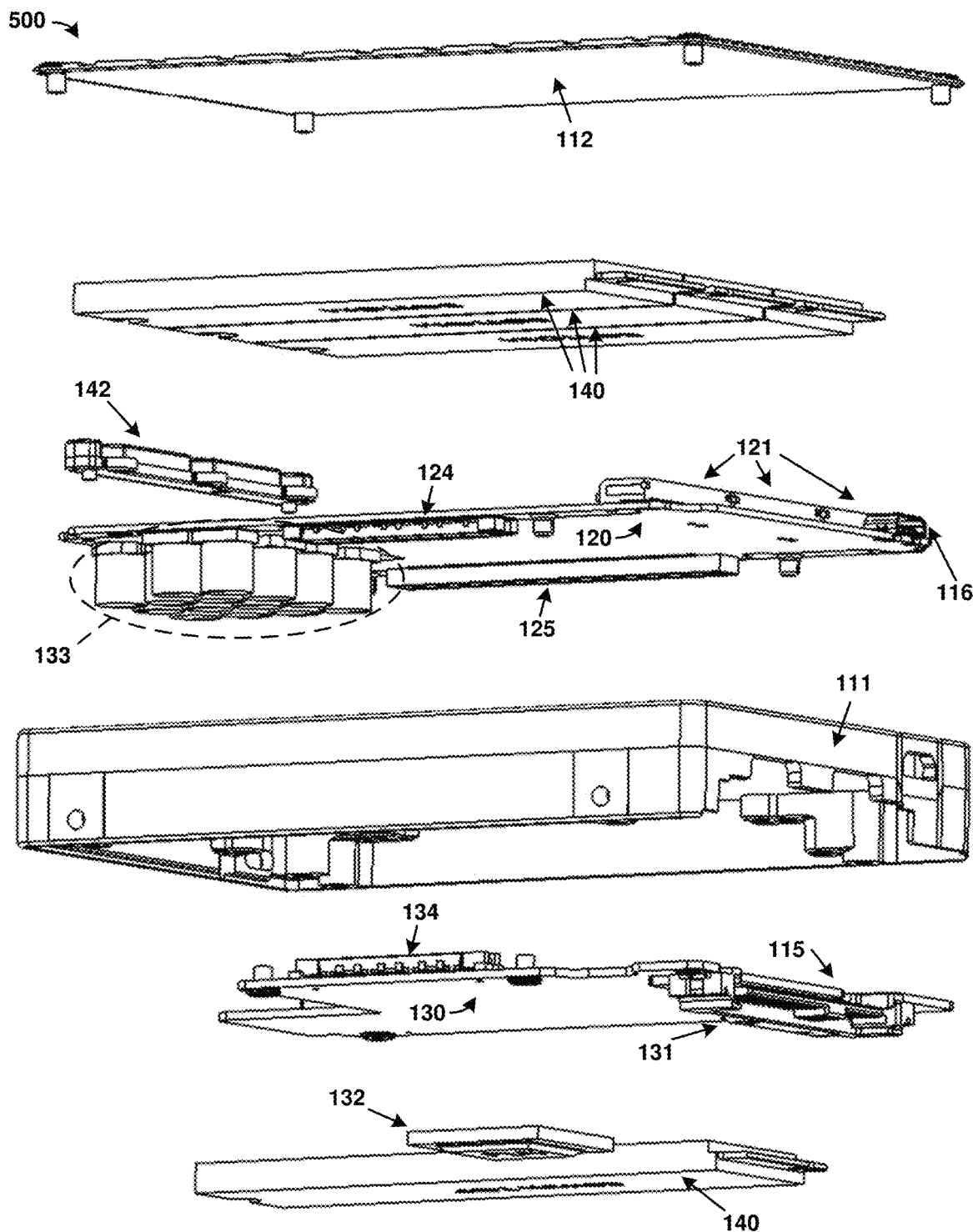
FIGURE 5
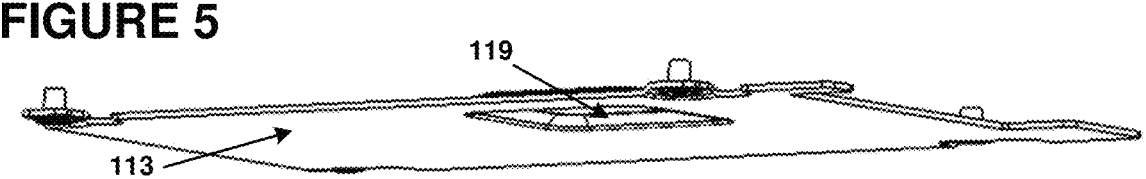

US 10,990,553 B2

ENHANCED SSD STORAGE DEVICE FORM FACTORS

RELATED APPLICATIONS

This application is a continuation of, and claims priority to, U.S. patent application Ser. No. 15/418,094, entitled "ENHANCED PCIe STORAGE DEVICE FORM FACTORS," and filed Jan. 27, 2017 (U.S. Pat. No. 10,255,215, with an issue date of Apr. 9, 2019). This application hereby claims the benefit of and priority to U.S. Provisional Patent Application 62/288,937, titled "ENHANCED PCIe STORAGE FORM FACTORS," filed Jan. 29, 2016, which is hereby incorporated by reference in its entirety.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

OVERVIEW

Enhanced data storage devices in various form factors are discussed herein. In one example, a storage drive includes a 2.5-inch form factor chassis that structurally supports elements of the storage drive, and at least one host connector. The storage drive also includes a plurality of M.2 storage device connectors, and a Peripheral Component Interconnect Express (PCIe) switch circuit configured to receive storage operations over the at least one host connector and transfer the storage operations for delivery to ones of the plurality of M.2 storage device connectors over associated device PCIe interfaces. The storage drive also includes power circuitry configured to provide holdup power to ones of the plurality of M.2 storage device connectors after loss of input power over the at least one host connector.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 4 illustrates an exploded view of an example storage device.

FIG. 5 illustrates an exploded view of an example storage device.

DETAILED DESCRIPTION

The various examples herein provide enhanced data storage devices of various form factors and configurations. The enhanced data storage devices herein also employ solid state memory devices, such as solid state drives, solid state M.2 form factor memory devices/drives, or other non-volatile type of data storage devices. Advantageously, several modular solid state storage drives or devices can be incorporated into a compact storage drive or expansion card that can interface with one or more host systems for handling of storage operations (i.e. read or write operations). Although solid state memory devices are typically employed, it should be noted that any suitable storage technology might be employed and incorporated to these enhanced data storage devices to provide compact, high-density, and robust storage devices. Moreover, the devices herein employ power holdup and power management features to ensure reliability and enhanced data handling during power interruptions.

Figure 10:
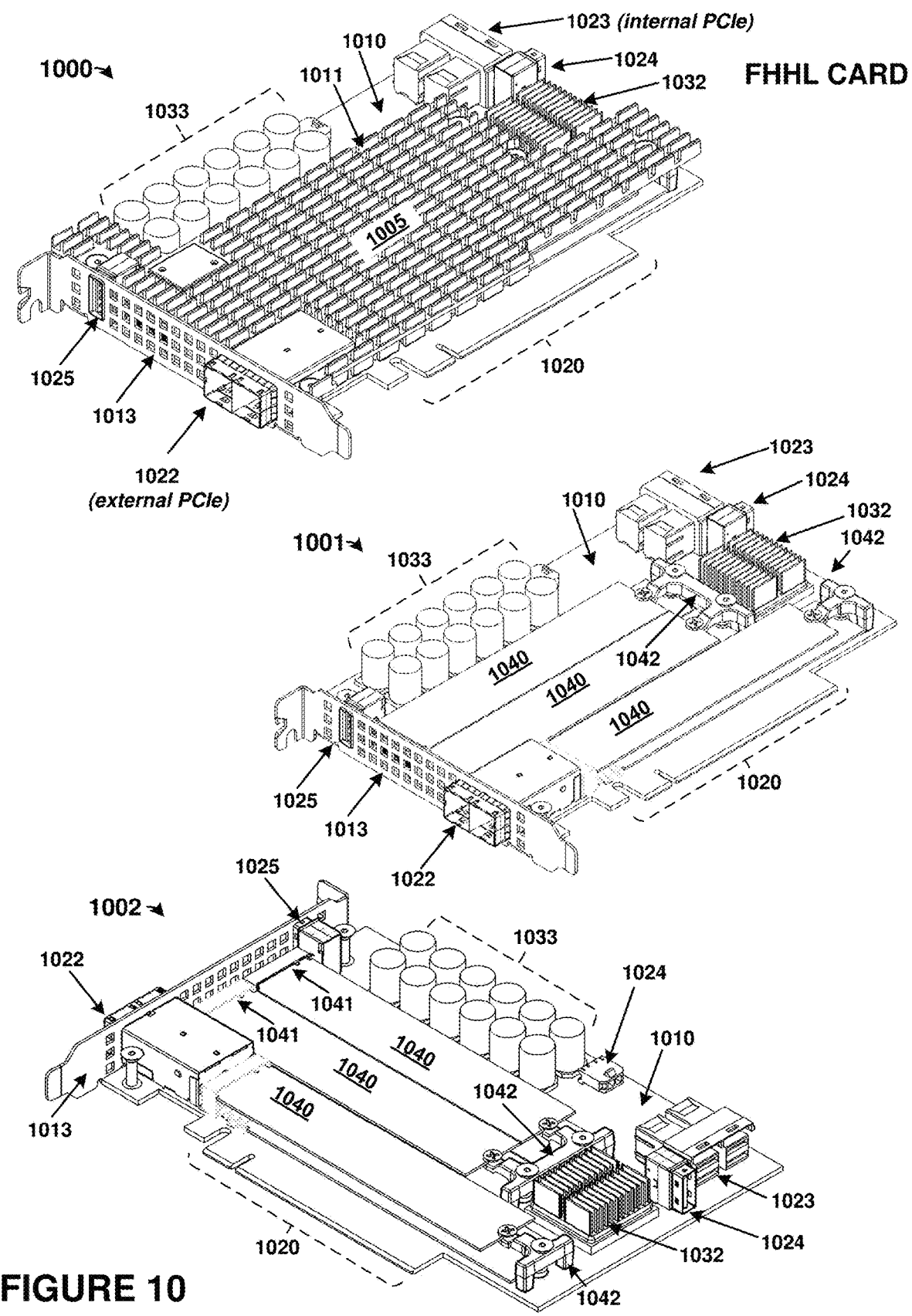
FIG. 10 illustrates example storage device implementations.
Figure 11:
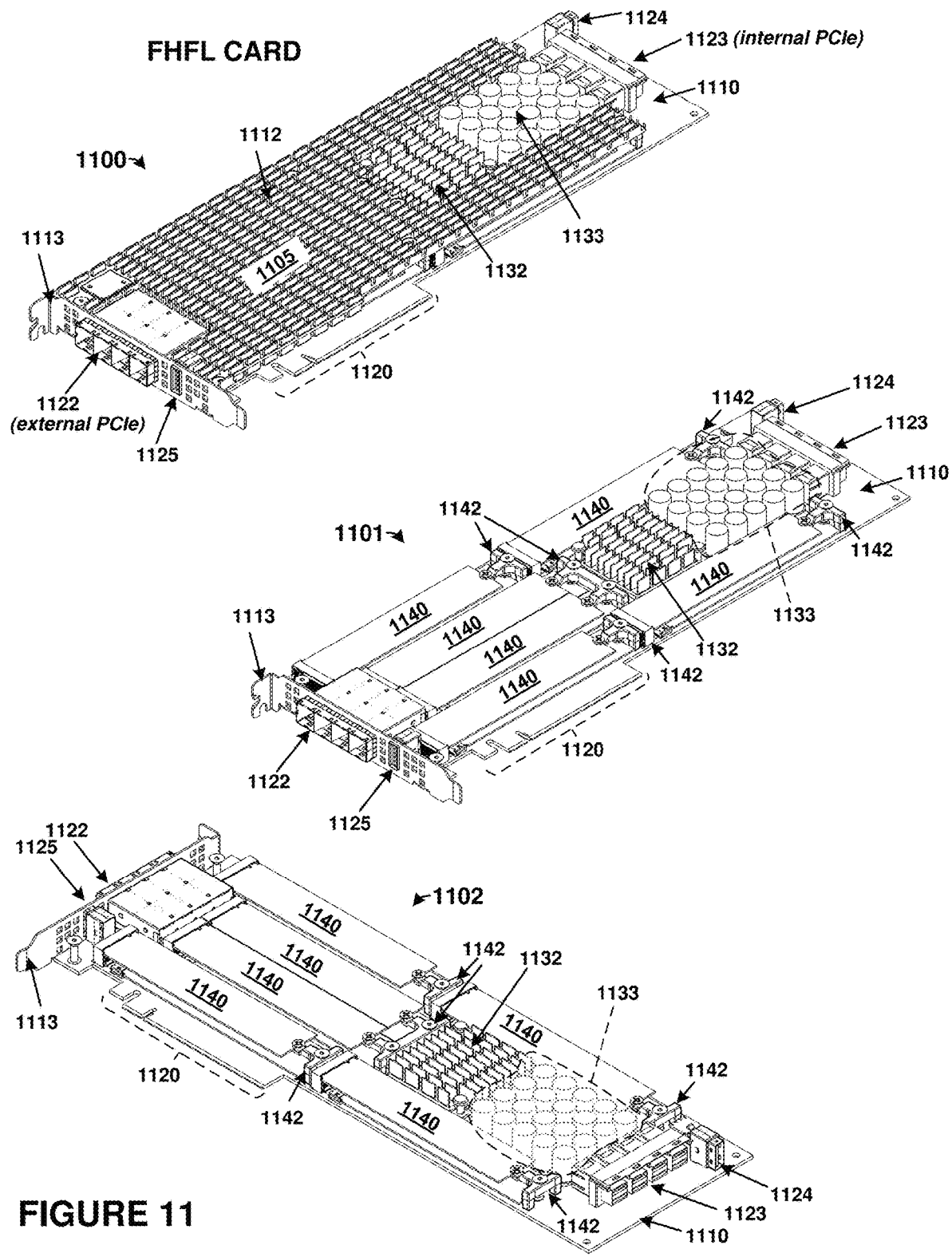
FIG. 11 illustrates example storage device implementations.
Figure 12:
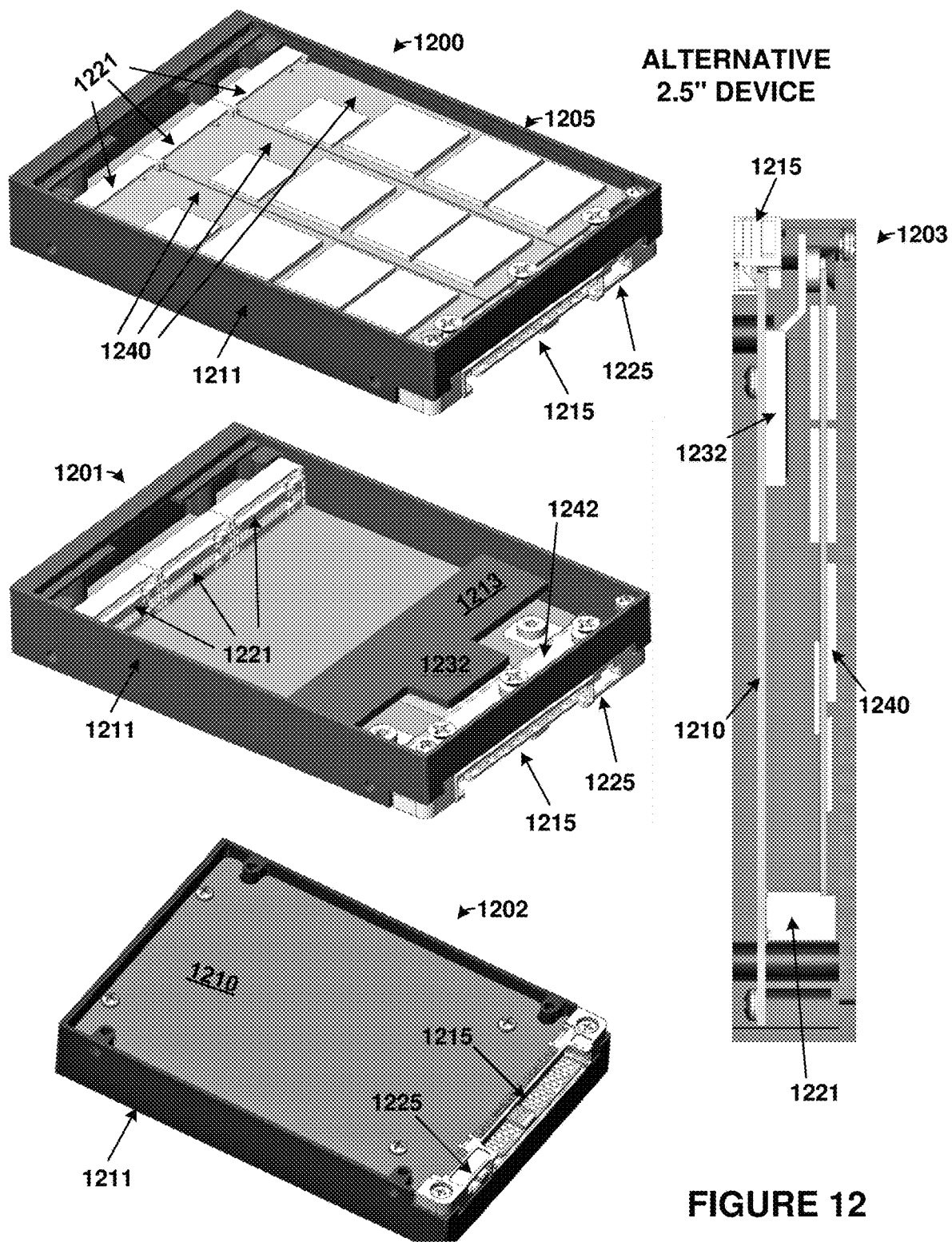
FIG. 12 illustrates example storage device implementations.

FIGS. 1-5 illustrate an example storage device, namely storage drive 110. The various views and configurations show storage drive 110, and are provided to highlight some of the main components employed. It should be understood that many other components, circuitry, and mechanical features might be omitted in the Figures for clarity. FIGS. 6-9 can illustrate further examples of the components, elements, and circuitry for elements of FIGS. 1-5. Furthermore, FIGS. 10-12 illustrate alternative physical arrangements of the previous examples and Figures.

Figure 1:
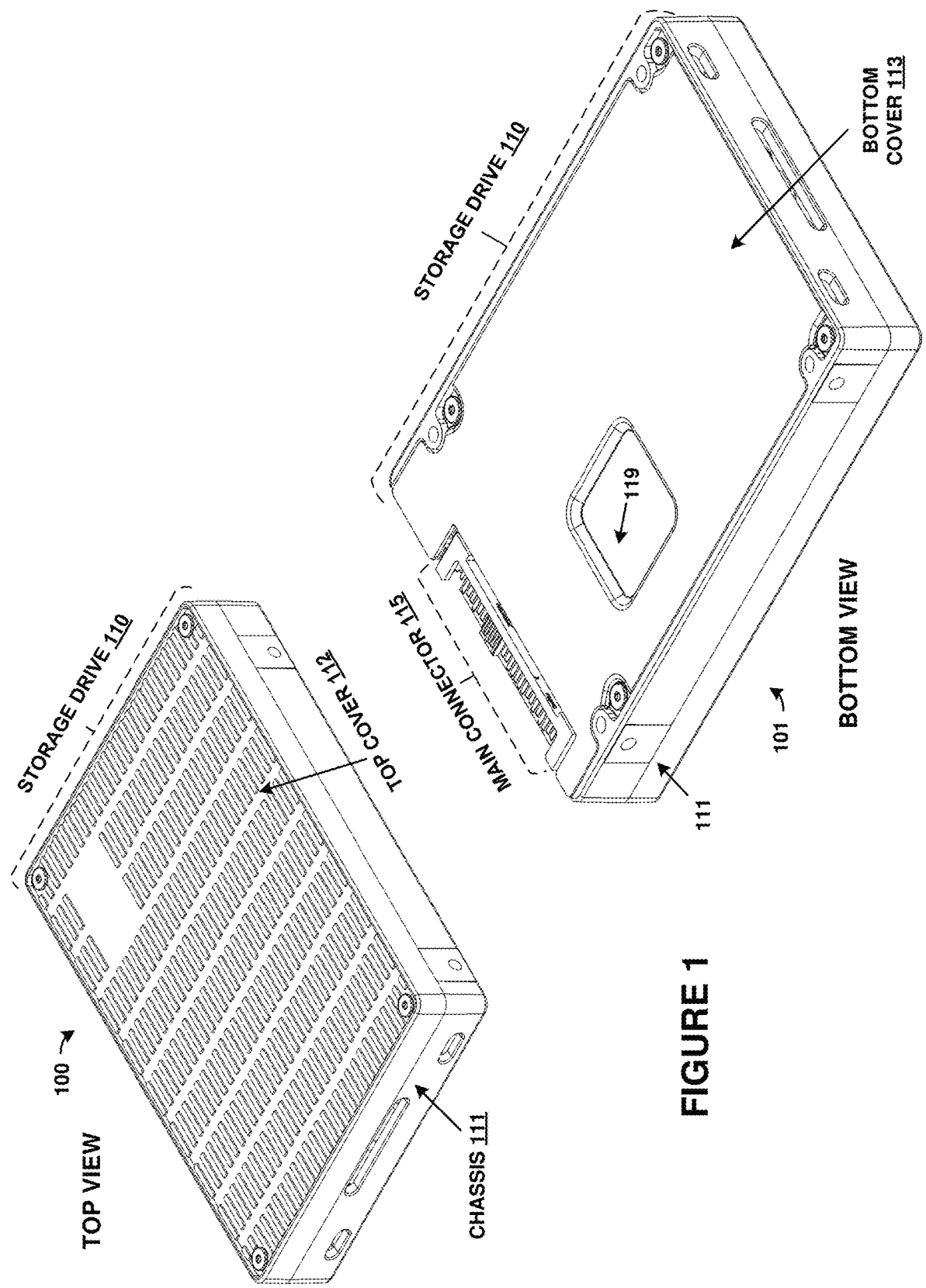
FIG. 1 illustrates example storage device implementations.

FIG. 1 illustrates example storage device implementations. In FIG. 1, two isometric views of storage drive 110 are shown. View 100 comprises a top view of storage drive 110 with a top cover 112 mated to chassis 111. View 101 comprises a bottom view of storage device 110 with bottom cover 113 mated to chassis 111. Also shown in view 101 are main connector 115 and thermal feature 119. Main connector 115 is coupled to internal electrical components and is mated to a circuit board. Main connector 115 can comprise a U.2 type connector that carries Peripheral Component Interconnect Express (PCIe) or NVM Express (NVMe) signaling, including combinations and variations thereof. In operation, a cable, socket, or other mating element will couple to main connector 115 to communicatively couple storage drive 110 to a host system, not shown in FIG. 1. A further discussion of main connector 115 and thermal feature 119 is included below.

In FIG. 1, storage drive 110 is shown that can be of various form factors. In this particular example, however, a 2.5 inch storage drive form factor is employed. Although the exact dimensions of the 2.5 inch form factor can vary, the dimensions are approximately 100 millimeters (mm) long and 69.85 mm wide. The "2.5 inch drive" form factor dimensions are defined in industry specification SFF-8201, and define a length=100.45 mm max, width=69.85+/−0.25 mm. There are numerous specific heights allowed (in mm), such as 19.05, 17, 15, 12.7, 10.5, 9.5, 8.47, 7.00, and 5. In the examples herein, the height employed is approximately 15 mm, which is a size commonly used in rack-mounted storage arrays. It should be understood that other heights can be employed. Furthermore, similar enhanced designs can be employed in other form factors, such as the add-in PCIe cards discussed herein, or 3.5 inch form factor drives defined by specification SFF-8351.

As will be seen in further examples below, similar internal electrical circuitry and software features might be included in a different form factor, such as expansion card form factors including HHHL cards (half-height half-length PCIe card) or a FHHL cards (full-height half-length PCIe card), FHFL cards (full-height full-length PCIe card), or HHFL cards (half-height full length). Moreover, other drive form factors larger or smaller than the 2.5 inch form factor can be employed. However, many of the examples herein will focus on the 2.5 inch form factor.

Figure 2:
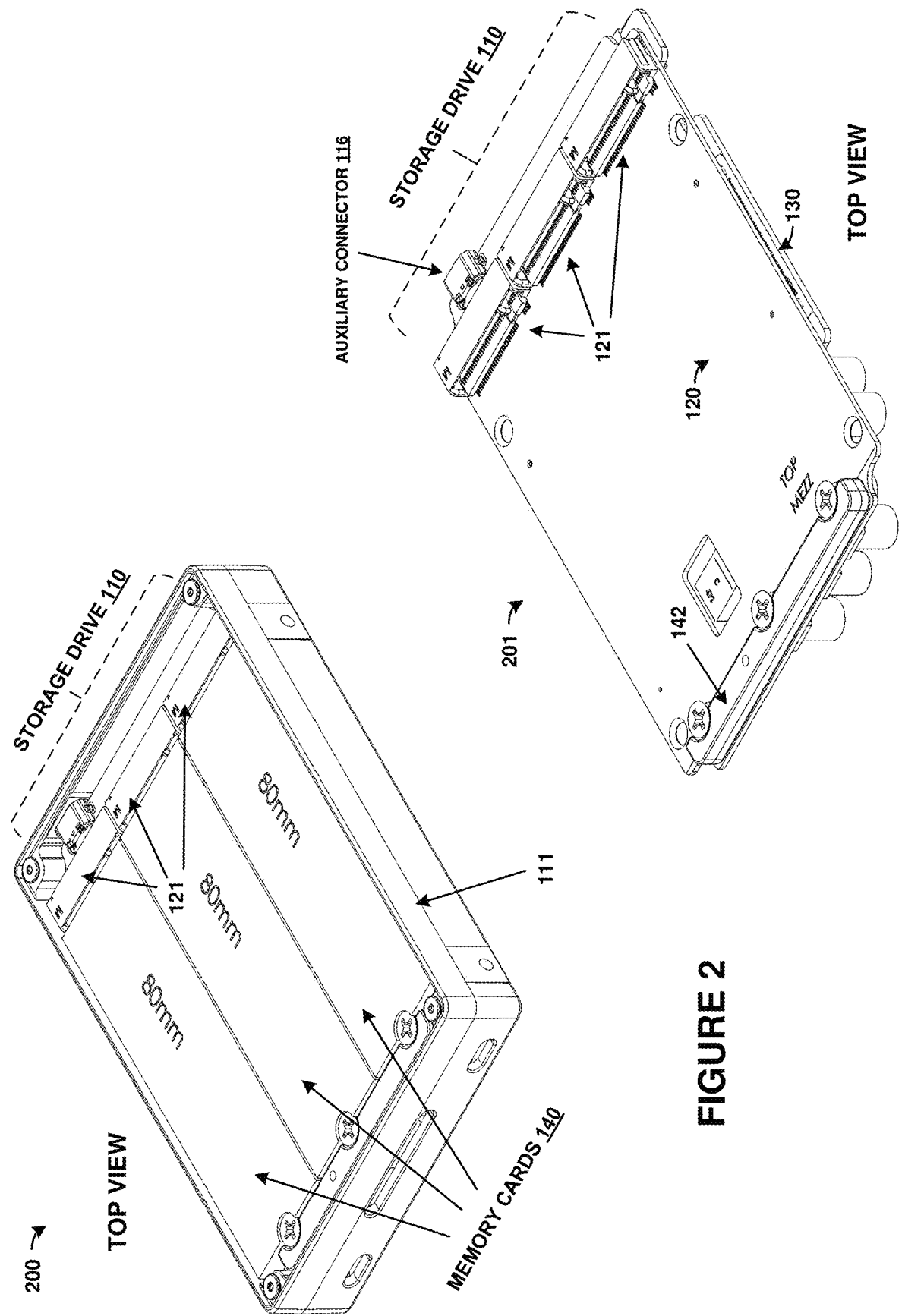
FIG. 2 illustrates example storage device implementations.

FIG. 2 illustrates example storage device implementations. In FIG. 2, two isometric views of storage drive 110 are shown. View 200 comprises a top view of storage drive 110 with a top cover removed from chassis 111. View 201 comprises a top view of internal circuit cards of storage device 110.

In view 200, three internal storage devices (memory cards 140) are shown inserted into corresponding connectors 121 and fastened at an end opposite of the connectors via end support 142. In FIG. 2, M.2 type solid state drive (SSD) memory devices are shown with an 80 mm length. Typical sizes of M.2 SSDs include lengths of 16, 26, 30, 38, 42, 60, 80 and 110 mm and widths of 12, 16, 22 and 30 mm. Advantageously, storage drive 110 employs the 2.5 inch form factor and includes three 80 mm M.2 devices side-by-side in the top side of chassis 111. In other examples where a larger form factor drive is employed, differently sized M.2 devices can be employed, or other non-M.2 devices. Also, devices of a length shorter than 80 mm might be employed in the 2.5 inch form factor.

In view 201, memory cards 140 and chassis 111 are removed to highlight connectors 121 as well as the underlying circuit boards. Top circuit board 120 is mated to another bottom circuit board 130 via one or more circuit board connectors internal to chassis 111. Auxiliary connector 116 can be included in some examples. Auxiliary connector 116 can comprise sideband interfaces, such as Universal Serial Bus (USB) interfaces, auxiliary power interfaces, or other interfaces that are auxiliary to main connector 115. Auxiliary connector 116 might be employed to carry management signals, monitoring or control signals, initialization signals, debug or troubleshooting signals, among others, including combinations thereof. In some examples, auxiliary connector 116 can be omitted.

Figure 3:
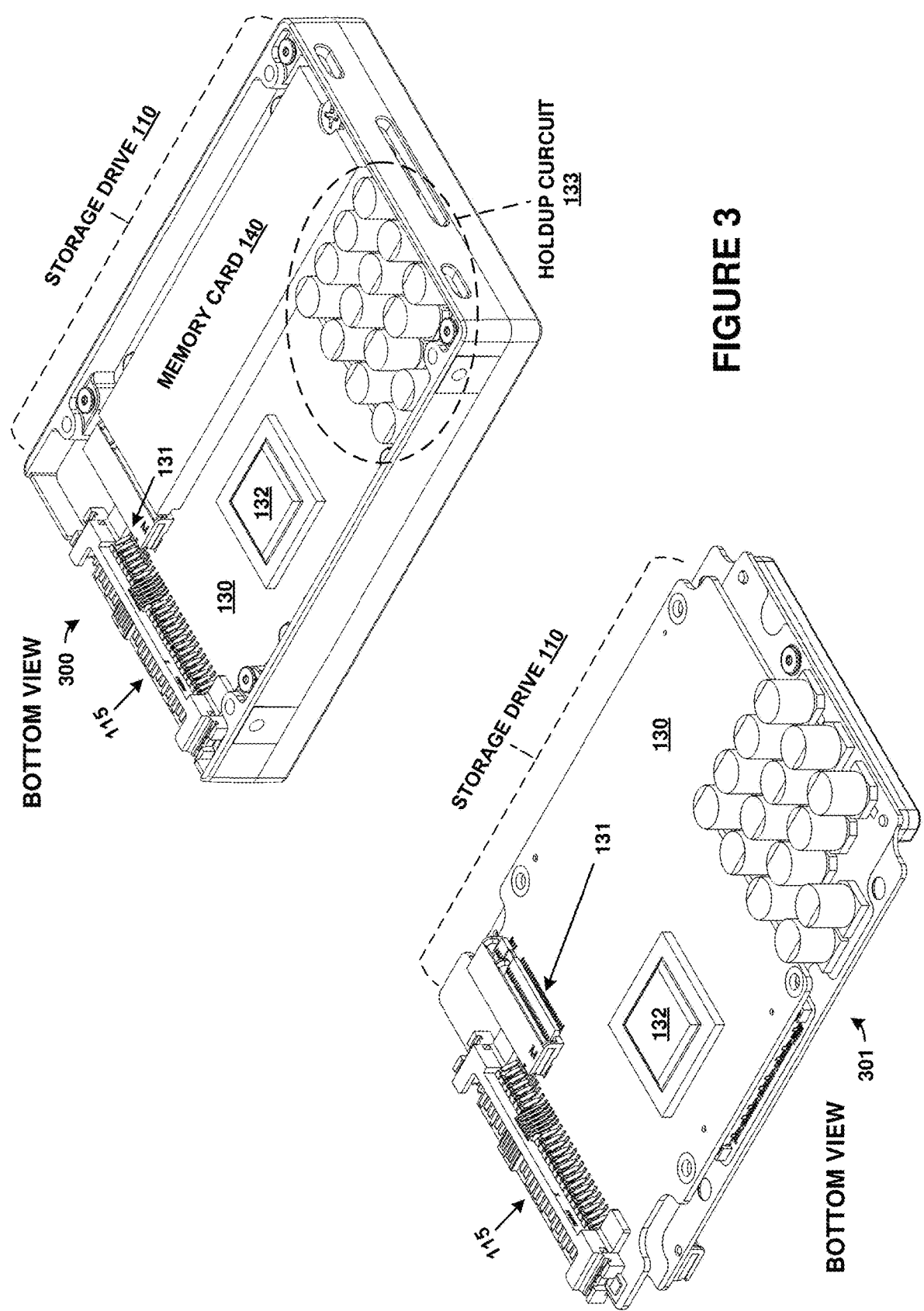
FIG. 3 illustrates example storage device implementations.

FIG. 3 illustrates example storage device implementations. In FIG. 3, two isometric views of storage drive 110 are shown. View 300 comprises a bottom view of storage drive 110 with a bottom cover removed from chassis 111. View 301 comprises a bottom view of internal circuit cards of storage device 110.

In view 300, main connector 115 can be seen attached to circuit board 130. Additionally, connector 131, PCIe switch circuit 132 and holdup circuit 133 are shown as coupled to circuit board 130. Also in view 300, one additional internal storage device (memory card 140) is shown inserted into corresponding connector 131 and fastened at an end opposite of the connectors via an end support. In FIG. 3, M.2 SSD memory device 140 is shown with an 80 mm length and inserted into M.2 connector 131, although as with FIG. 2, other form factors and sizes might apply.

In view 301, memory card 140 and chassis 111 are removed to highlight connectors 131 as well as the underlying circuit boards. Bottom circuit board 130 is mated to another top circuit board 120 via one or more circuit board connectors internal to chassis 111. Holdup circuit 133 comprises various circuitry discussed in FIGS. 6-8. In FIG. 3, an array of power storage elements, namely capacitors, is shown. This capacitor array holds energy in reserve until power is removed from storage drive 110, either from planned or unplanned removal of power. Once power removal is detected, then the capacitor array can provide the stored energy to one or more of the electrical elements of storage drive 110.

PCIe switch circuit 132 comprises one or more PCIe crosspoint switches, which logically interconnect various ones of the associated PCIe links based at least on the traffic carried by associated PCIe links. PCIe switch circuit 132 is coupled via PCIe links to main connector 115 and to each memory card 140, among other elements. PCIe switch circuit 132 can be communicatively coupled via other communication interfaces as well. Further operation of PCIe switch circuitry is discussed below in FIGS. 6-8.

FIGS. 4-5 illustrate exploded views 400 and 500 of storage device 110. View 400 orients a perspective of device 110 from a top side, while view 500 orients a perspective of device 110 from a bottom side. Views 400 and 500 each include similar elements. These elements include top cover 112, top memory devices 140, memory device end support 142, top circuit board 120, chassis 111, bottom circuit board 130, bottom memory device 140, PCIe switch circuit 132, bottom cover 113, and thermal feature 119. Omitted from views 400 and 500 for clarity are fasteners as well as some circuit board details and circuitry elements.

Chassis 111, top cover 112, and bottom cover 113 each can comprise various materials such as metals, alloys, polymers, carbon composites, or other materials. In some examples, chassis 111, top cover 112, and bottom cover 113 each comprise aluminum materials. In this example, top cover 112 includes finned features to dissipate heat more efficiently from top cover, and bottom cover 113 includes thermal feature 119. Thermal feature 119 comprises a depression in the material of bottom cover 113 and is configured to conduct heat from at least PCIe switch circuit 132 to bottom cover 113. Thermal pads or thermally conductive paste can be included to conduct heat to thermal feature 119 from the associated circuitry. The enclosure of storage drive 110 can include chassis 111, top cover 112, and bottom cover 113, along with further elements. Sealing features, such as gaskets or seals might be included to reduce ingress of gasses, liquids, or solids into an internal portion of storage drive 110 formed by the enclosure. Chassis 111, top cover 112, and bottom cover 113 can also be configured to conduct heat from any of the elements enclosed therein to the external environment, such as ones of memory cards 140.

Circuit boards 120 and 130 each comprise assemblies of various circuitry, connectors, materials, interconnect, coatings, markings, fastener features, and other elements. Typically, circuit boards 120 and 130 each comprise an individual printed circuit board as a base onto which various components are mounted and into which electrical or optical interconnect is formed. Circuit boards 120 and 130 each can be fastened to chassis 111 for structural support and vibration resiliency. Circuit board 120 includes two connectors in this example to mate with circuit board 130. One or more connectors can be employed in further examples. Circuit board connector 124 of circuit board 120 couples to circuit board connector 134 of circuit board 130. Circuit board connector 125 of circuit board 120 couples to circuit board connector 135 of circuit board 130. In one example, a first connector pair (124, 134) carries supply power from board 130 to board 120, while the other connector pair (125, 135) carries the PCIe signaling between boards 120-130, or vice-versa, along with other signaling and combinations thereof.

The circuit board connectors are configured to carry power and signals between the boards. The signaling comprises PCIe signaling, sideband signaling, control signaling, discrete signaling, digital signaling, or analog signaling, among other signaling. The power includes device power for powering storage cards 140 as well as for other circuit components on each board. Typically, input power is provided from a host system or other power source via main connector 115 to bottom circuit board 130. A power control circuitry is employed on bottom circuit board 130 that distributes the input power to the various components of circuit board 130 via signaling associated with circuit board 130. Additionally, the power control circuitry of circuit board 130 distributes this input power over one or more of the internal connectors (circuit board connector 134 or circuit board connector 135) to circuit board 120 over an associated connector on circuit board 120 (circuit board connector 124 or circuit board connector 125). The power control circuitry can include power conditioning, filtering, conversion, and handling circuitry. Various voltages can be employed and converted among. Circuit board 120 can include further power control circuitry.

In some examples, holdup power is stored within capacitor array 133 on circuit board 130. This holdup power might be stored at a predetermined voltage level, which might be a higher voltage level than the input power, such as 30 VDC or higher (see FIG. 7). This holdup power at the high voltage might be supplied to voltage step-down circuitry on circuit board 130 for conversion to a working voltage similar to the input voltage (such as a supply voltage for memory cards 140 plugged into connectors 141 on circuit board 130). In further examples, this holdup power at the high voltage might also be supplied via one of the internal connectors to circuit board 120. Further voltage conversion circuitry can be included on circuit board 120 to convert the high voltage to a working voltage similar to the input voltage or a suitable voltage for circuit components on circuit board 120 (such as a supply voltage for memory card 140 plugged into connector 131 on circuit board 120).

Figure 6:
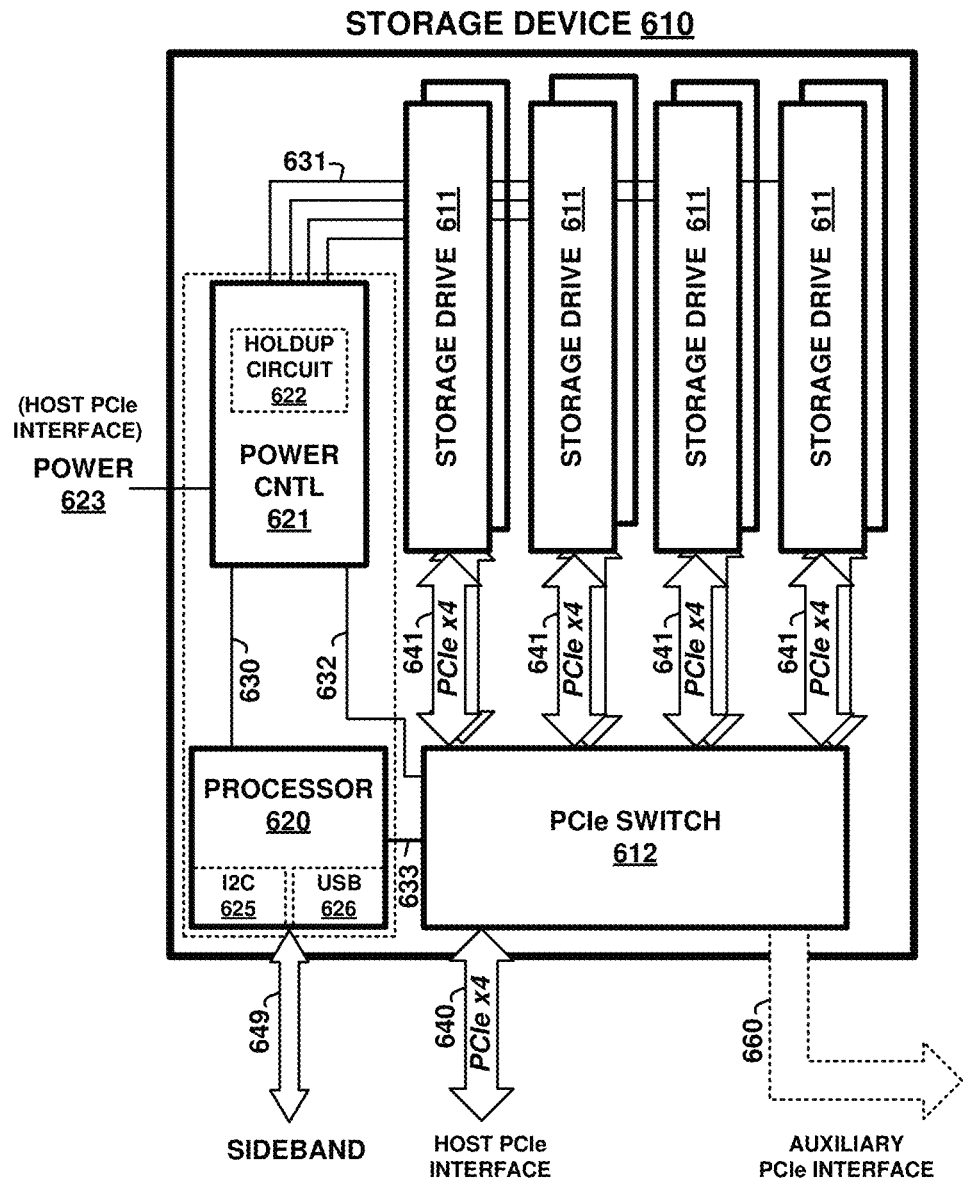
FIG. 6 illustrates an example storage system in an implementation.

FIG. 6 illustrates a block diagram of circuitry and other elements of storage device 610. Storage device 610 can comprise one example implementation of storage drive 110 in FIGS. 1-5, although variations are possible. Storage device 610 includes at least four storage drives 611, PCIe switch 612, processor 620, power control module 621, and holdup circuit 622. Power control module 621 distributes power to each element of storage device 610 over associated power links 630-632. Power control module 621 can selectively enable/disable power for each power link. Further communication links can be included for intra-card communication between the various elements of storage device 610.

Signals/power can be carried over a single host connector, such as a U.2 connector discussed for FIGS. 1-5, or can be carried over a host connector in conjunction with a power connector and one or more auxiliary connectors. In one example, power link 623, sideband links 649, and host PCIe interface 640 are all included in a U.2 host connector. Auxiliary PCIe links 660 might be included in the same connector, or a separate connector. Also, sideband links 649 might be split among more than one connector.

Storage device 610 includes one or more storage drives 611, such as at least four each shown in FIG. 6. Storage device 610 also includes one or more Peripheral Component Interconnect Express (PCIe) switches, processors, and control system elements. PCIe switch 612 communicates with one or more on-device storage drives over associated PCIe links. PCIe switch 612 is also communicatively coupled to an on-device processor or control system for traffic statistics retrieval, power monitoring, status monitoring, among other operations.

PCIe switch 612 communicates with a host system or host module (not pictured) over PCIe link 640. PCIe link 640 comprises a PCIe link with at least four lanes, namely a "x4" PCIe link, although a different number of PCIe lanes can be employed. Additionally, more than one PCIe link 640 can be employed for load balancing, redundancy, and failover protection for storage device 610, such as shown for auxiliary PCIe interface 660. PCIe switch 612 also communicates with at least four storage drives 611 over associated x4 PCIe links 641. PCIe can support multiple bus widths, such as x1, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling.

PCIe interface 640 can carry NVMe (NVM Express) traffic issued by a host processor or host system. NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface is employed to transport NVMe traffic and present a multi-drive system comprising storage drives 611 as one or more NVMe virtual logical unit numbers (VLUNs) over a PCIe interface.

In NVMe operations, such as an NVMe write operation, data can be received over any of PCIe links 640 or 660 for any storage drive 611. For example, a write operation can be an NVMe write operation received over PCIe link 640 from a device employing an NVMe protocol transported over a PCIe interface. In another example, the write operation can be an NVMe write operation received over PCIe link 640 or 660 from an external device employing an NVMe protocol transported over a PCIe interface. An associated storage drive can receive the NVMe traffic over an associated PCIe interface 641 and respond accordingly, such as with a write confirmation or with read data in the case of an NVMe read operation.

In further examples, processor 620 can handle PCIe traffic for the storage drives and manage the storage drives in a logical manner. For example, data striping can be employed by processor 620 to stripe data for a particular write transaction over any number of storage drives 611, such as over all of the storage drives or a subset of the storage drives. Likewise, data redundancy can be employed to mirror data over any of storage drives 611. In further examples, ones of storage drives 611 are presented as one or more logical drives or logical volumes to a host system, such as one or more NVMe virtual logical units (VLUNs). Processor 620 can manage striping, mirroring, or logical volume establishment and presentation. In a first example, processor 620 receives all PCIe traffic for storage drives 611 over PCIe interface 633 and distributes to appropriate storage drives 611 to achieve striping, mirroring, or logical volumes. In other examples, processor 620 monitors traffic in PCIe switch 612 and instructs PCIe switch 612 to direct PCIe traffic to appropriate storage drives to achieve striping, mirroring, or logical volumes.

As mentioned above, processor 620 can present the storage resources of storage device 610 as a VLUN, such as NVMe VLUNs. Processor 620 can present any number of VLUNs to an external system over a PCIe interface, such as any of PCIe links 640 or 660. These VLUNs can be presented as an NVMe target. An NVMe target can present the storage resources of storage device 610 as a single storage target, such as emulating a single storage drive, over a PCIe interface. In this manner, a plurality of storage drives that comprise any number of storage drives 611 can be presented as a single NVMe target to an external system over a PCIe interface. Processor 620 can receive NVMe storage traffic, such as NVMe frames, and distribute these storage transactions for handling by an assigned storage drive 611. In other examples, processor 620 monitors NVMe storage traffic in PCIe switch 612 and instructs PCIe switch 612 to direct PCIe traffic to appropriate storage drives to achieve VLUNs or NVMe targets.

Auxiliary PCIe interface 660 can optionally be included in storage device 610. Auxiliary PCIe interface 660 can be employed to connect two or more PCIe storage devices to each other for transfer of user data, storage operations, status, control signaling, operational information, or other data between storage devices, such as two of storage device 610. Auxiliary PCIe interface 660 can be employed to connect storage device 610 to more than one host system, such as to two host systems simultaneously. Auxiliary PCIe interface 660 can comprise a different PCIe bus width or lane allocation than host PCIe interface 640. Signaling for auxiliary PCIe interface 660 can be included in a same physical connector as PCIe interface 640 (such as a U.2 connector) or can be included in a separate connector than that of PCIe interface 640. In some examples, mini-SAS connectors and cabling are employed and are configured to carry PCIe signaling of auxiliary PCIe interface 660. Auxiliary PCIe interface 660 can also include non-PCIe signaling, such as sideband interfaces 649 or other interfaces. Auxiliary PCIe interface 660 can be used for cluster interconnect and can terminate at external connectors, such as mini-Serial Attached SCSI (SAS) connectors which are employed to carry PCIe signaling over mini-SAS cabling. In further examples, MiniSAS HD cables are employed that drive 12 Gb/s versus 6 Gb/s of standard SAS cables. 12 Gb/s can support PCIe Gen 3. A connector for auxiliary PCIe interface 660 can comprise mini-SAS connectors that comprise mini-SAS jacks. Associated cabling can comprise SAS cabling which can include associated shielding, wiring, sheathing, and termination connectors.

PCIe switch 612 comprises one or more PCIe crosspoint switches, which logically interconnect various ones of the associated PCIe links based at least on the traffic carried by each PCIe link. PCIe switch 612 establishes switched connections between any PCIe interfaces handled by PCIe switch 612. Each PCIe switch port can comprise a non-transparent (NT) or transparent port. An NT port can allow some logical isolation between endpoints, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a logical domain-based PCIe signaling distribution can be included which allows segregation of PCIe ports of a PCIe switch according to user-defined logical groups. In some examples, PCIe switch 612 comprises a PLX Technology PEX8725 10-port, 24 lane PCIe switch chip. In some examples, PCIe switch 612 comprises a PLX Technology PEX8796 24-port, 96 lane PCIe switch chip.

Although PCIe link 640 is used in FIG. 6, it should be understood that additional or different communication links or busses can be employed, such as Ethernet, Serial Attached SCSI (SAS), FibreChannel, Thunderbolt, Serial Attached ATA Express (SATA Express), among other interconnect, network, and link interfaces. Any of the links in FIG. 6 can each use various communication media, such as air, space, metal, optical fiber, or some other signal propagation path, including combinations thereof. Any of the PCIe links in FIG. 6 can include any number of PCIe links or lane configurations. Any of the links in FIG. 6 can each be a direct link or might include various equipment, intermediate components, systems, and networks. Any of the links in FIG.

6 can each be a common link, shared link, aggregated link, or may be comprised of discrete, separate links.

Processor 620 can optionally communicate over at least sideband links 649. In some examples, sideband links are provided over auxiliary connector 116 of FIGS. 1-5. Sideband links 649 can include Universal Serial Bus (USB), SMBus, JTAG, Inter-Integrated Circuit (I2C), controller area network bus (CAN), or any other communication interface, and in some examples is provided over portions of PCIe link 640. In this example, processor 620 includes I2C interface 625 and USB interface 626 for communication over sideband links 649. I2C interface 625 and USB interface 626 can be included in separate circuitry or included in similar elements as processor 620. Processor 620 and PCIe switch 612 can communicate over an associated communication link 633, which can be an I2C or a PCIe link, among other link types.

Each storage drive 611 comprises a solid state drive (SSD) in this example, and communicates with systems external to the SSD over an associated PCIe interface included in each storage drive 611. Each storage drive 611 can comprise an individual M.2 SSD card, which communicates over an associated PCIe interface 641, which can comprise PCIe interfaces such as described for PCIe interface 640, although variations are possible. The solid state storage media of storage drives 611 can comprise flash memory, static RAM, NAND flash memory, NOR flash memory, memristors, or other solid state media. Instead of or in addition to solid state media, each storage drive 611 can comprise magnetic storage, such as hard disk drives, tape drives, magnetoresistive memory devices, or resistive memory devices, and the like, or can comprise optical storage, which might include phase change memory.

Each storage drive 611 can receive read transactions and write transactions issued by a host system, such as a host processor. Responsive to a read transaction, each storage drive 611 can retrieve data identified by the read transaction and transfer the data for delivery to the associated host. Responsive to a write transaction, each storage drive 611 can write data that accompanies the write transaction to storage media associated with storage drive 611. Data striping can be employed by storage device 610 to stripe data for a particular write transaction over any number of storage drives 611. Each storage drive 611 can handle physical management of the associated storage media, such as storage medium-level read/writes and wear-leveling when flash memory is employed.

Processor 620 comprises one or more microprocessors, processing devices, multi-core processors, processing circuitry, or other processing system. Processor 620 can include one or more non-transitory memory devices, such as RAM, solid state storage, or other memory to store instructions that are executable by processor 620 to operate as discussed herein. In some examples, processor 620 comprises an ARM microcontroller, ARM microprocessor, field-programmable gate array (FPGA), application specific integrated circuit (ASIC), application specific processor, or other microprocessor or processing elements. Processor 620 can comprise any processing elements discussed below for processing system 800 of FIG. 8. Processor 620 can monitor usage statistics, traffic status, or other usage information through link 633. PCIe switch 612 can track this usage information during normal operation and data transfer with storage drives 611, and processor 620 can retrieve this usage information as needed over link 633.

Holdup circuitry 622 is included on storage device 610 to provide power to the storage device when input power has been lost or removed for the storage device. In some examples, the storage device is removed from an associated mating connector and input power is lost due to the removal. In other examples, power is lost to a host system into which storage device 610 is connected, such as during a facility power outage or when an associated power supply fails.

The various holdup circuitry is also accompanied by a power controller circuit 621 to selectively provide power to the elements of storage device 610. The power controller can receive control instructions from a processor of storage device 610 or from other processors or modules, such as over the Inter-Integrated Circuit (I2C), Ethernet, or Universal Serial Bus (USB) sideband interfaces, or over a PCIe interface. Storage device 610 can receive power over one or more power links as a power source for the various elements of storage device 610, and these power links can be included in a PCIe connector of storage device 610. Holdup circuitry 622 includes energy storage devices for storing power received over the power link for use during power interruption events, such as loss of source power. Holdup circuitry 622 can include capacitance storage devices, such as an array of capacitors. Further discussion of examples of power control circuitry is found below.

Although processor 620 and power controller 621 are shown as separate elements in FIG. 6, it should be understood that processor 620 and power controller 621 can be included in the same processing circuitry. In some examples, processor 620 and power controller 621 comprise an ARM-compatible microprocessor or microcontroller, although other circuitry can be employed.

Storage device 610 can provide self-power (holdup power) during power interruption events. Typically, storage device 610 will use any associated holdup power to commit in-flight write data associated with pending write operations before power down of circuitry of storage device 610. The in-flight write data can be committed to associated storage drives 611, or can be committed to other non-volatile memory such as a non-volatile write cache which can hold write data until power is restored. Once any in-flight write data has been committed to non-volatile memory, then excess or remaining holdup power can be held for future use, bled off into dummy loads, or redistributed to other devices over PCIe power links or other power links.

In some examples, no pending write operations are present when input power is lost, and a larger amount of excess power is available on storage device 610. This excess power can be redistributed to a different storage device to aid that storage device in commit processes for associated write operations. Advantageously, excess holdup power of one storage device can be used to power operations of another storage device during power interruptions. This redistributed power can be transferred to other storage devices or other PCIe devices over power links included in the PCIe interface connectors.

Power control module 621 includes circuitry to selectively provide power to any of the elements of storage device 610. Power control module 621 can receive control instructions from processor 620 or over PCIe link 640. In some examples, power control module 621 comprises processing elements discussed above for processor 620, or is included in the elements of processor 620. Power control module 621 can receive power over power link 623 as a power source for the various elements of storage device 610. Holdup circuit 622 includes energy storage devices for storing power received over power link 623 for use during power interruption events, such as loss of source power. Holdup circuit 622 can include capacitance storage devices, such as an array of capacitors. Further discussion of examples of power control circuitry is found below.

In some examples, bidirectional power flow is possible over link 623. Power can be accepted by storage device 610 when input power is available, such as from a mating connector. Power can be redistributed to other storage devices by module 610 over link 623 when input power is not available, such as during power interruption events. When storage device 610 is removed from a mating connector, then power can be bled off into associated power sink circuitry. Although one power link 623 is shown, it should be understood that more than one link can be included, such as separate input and output links or separate links for different voltage levels.

Figure 7:
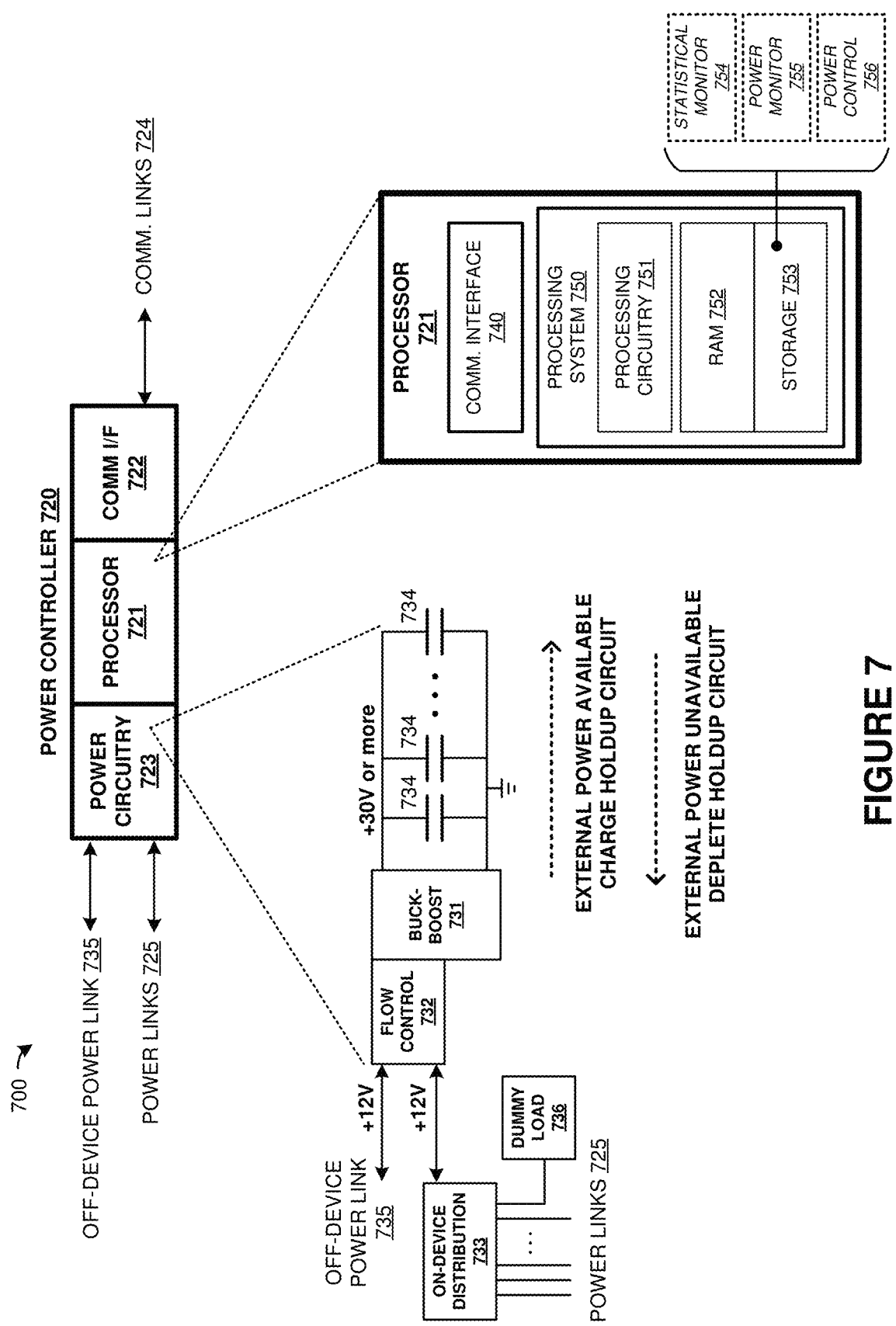
FIG. 7 illustrates an example control system in an implementation.

FIG. 7 is a block diagram illustrating power control system 700. Power control system 700 can be included on any of the storage devices discussed herein, such as the power controller or holdup circuitry portions of storage device 110 of FIG. 1, or storage device 610 of FIG. 6, among others. Power control system 700 illustrates power controller 720, which can be an example of any of the power control modules or processor discussed herein, such as power control module 621 or processor 620 of FIG. 6. Power controller 720 includes processor 721, communication interface 722, and power circuitry 723. Each of the elements of power controller 720 are communicatively coupled.

Communication interface 722 communicates over communication links 724, which can include any of the communication link protocols and types discussed herein. Communication interface 722 can include transceivers, network interface equipment, bus interface equipment, and the like. In operation, communication interface 722 receives control instructions from another processing unit over communication links 724. Communication links 724 also communicate with elements of the device that power controller 720 is employed on. For example, on a storage device, communication links 724 receive write data commit status of storage drives, power control instructions from other processors or processing systems, and can communicate over a PCIe interface or sideband communications of a PCIe interface.

Processor 721 includes any processor or processing system discussed herein, and controls the operations of power controller 720, such as initiating power up of storage device elements, initiating power down of storage device elements, monitoring usage statistics for a storage device or for other storage devices.

To further describe the circuitry and operation of processor 721, a detailed view is provided, although variations are possible. Processor 721 includes communication interface 740 and processing system 750. Processing system 750 includes processing circuitry 751, random access memory (RAM) 752, and storage 753, although further elements can be included. Example contents of storage 753 are further detailed by software modules 754-756.

Processing circuitry 751 can be implemented within a single processing device but can also be distributed across multiple processing devices or sub-systems that cooperate in executing program instructions. Examples of processing circuitry 751 include general purpose central processing units, microprocessors, application specific processors, and logic devices, as well as any other type of processing device. In some examples, processing circuitry 751 includes physically distributed processing devices, such as cloud computing systems.

Communication interface 740 includes one or more communication and network interfaces for communicating over communication networks or discrete links, such as communication interface 722, or further serial links, packet networks, the Internet, and the like. The communication interfaces can include one or more local or wide area network communication interfaces which can communicate over Ethernet or Internet protocol (IP) links. Communication interface 740 can include network interfaces configured to communicate using one or more network addresses, which can be associated with different network links. Examples of communication interface 740 include network interface card equipment, transceivers, modems, and other communication circuitry. Although communication interface 740 and communication interface 722 are both shown in FIG. 7, it should be understood that these can comprise different interfaces or combined into the same communication interface module, and can communicate over links 724.

RAM 752 and storage 753 together can comprise a non-transitory data storage system, although variations are possible. RAM 752 and storage 753 can each comprise any storage media readable by processing circuitry 751 and capable of storing software. RAM 752 can include volatile and nonvolatile, removable and non-removable media implemented in any method or technology for storage of information, such as computer readable instructions, data structures, program modules, or other data. Storage 753 can include non-volatile storage media, such as solid state storage media, flash memory, phase change memory, or magnetic memory, including combinations thereof. RAM 752 and storage 753 can each be implemented as a single storage device but can also be implemented across multiple storage devices or sub-systems. RAM 752 and storage 753 can each comprise additional elements, such as controllers, capable of communicating with processing circuitry 751.

Software stored on or in RAM 752 or storage 753 can comprise computer program instructions, firmware, or some other form of machine-readable processing instructions having processes that when executed a processing system direct processor 721 to operate as described herein. For example, software drives processor 721 to monitor operating statistics and status for a storage device, monitor power status for the cards and modules, and instruct power circuitry 723 to control flow of holdup power or operational power, among other operations. The software can also include user software applications. The software can be implemented as a single application or as multiple applications. In general, the software can, when loaded into a processing system and executed, transform the processing system from a general-purpose device into a special-purpose device customized as described herein.

Software modules 754-756 each comprise executable instructions which can be executed by processor 721 for operating power controller 720 according to the operations discussed herein. Specifically, statistical monitor 754 monitors usage status or usage statistics for elements of a storage device. The usage statistics include data transfer rates of links, error rates of links, a cumulate number of errors of links, among other statistics. The usage statistics can be collected and stored by processor 721 in a data structure, such as a database or table and stored in storage 753, RAM 752, or other storage elements. Power monitor 755 monitors power inrush statistics during a power-up process, power status statistics, power active status, voltage levels, phase measurements, current draw, holdup circuit status or levels, card/module insertion status, thermal levels, among other statistics. Power control 756 instructs power circuitry to power up or power down an associated storage device or module responsive to statistical monitor 754 or power monitor 755, among other signals such as discrete signals monitored by power circuitry 723. Power control 756 can power up or power down a card or module responsive to data commit status of associated storage drives or other circuitry, responsive to insertion status, or other factors.

Software modules 754-756 can reside in RAM 752 during execution and operation by processor 721, and can reside in storage space 753 during a powered-off state, among other locations and states. Software modules 754-756 can be loaded into RAM 752 during a startup or boot procedure as described for computer operating systems and applications.

Storage 753 can include one or more storage systems comprising flash memory such as NAND flash or NOR flash memory, phase change memory, magnetic memory, among other solid state storage technologies. As shown in FIG. 7, storage 753 includes software modules 754-756 stored therein. As described above, storage 753 can store software modules 754-756 in one or more non-volatile storage spaces during a powered-down state of processor 721, among other operating software, such as operating systems.

Processor 721 is generally intended to represent a computing system where at least software modules 754-756 are deployed and executed in order to render or otherwise implement the operations described herein. However, processor 721 can also represent any computing system on which at least software modules 754-756 can be staged and from where software modules 754-756 can be distributed, transported, downloaded, or otherwise provided to yet another computing system for deployment and execution, or yet additional distribution.

Power circuitry 723 includes various power control, voltage regulation, power holdup, and other circuitry. Power circuitry 723 receives power from a power source, such as off-device power link 735, and distributes power to on-device elements over ones of power links 725.

As a specific example of power circuitry 723, various elements are shown in FIG. 7. These elements include buck-boost module 731, flow control module 732, on-device distribution module 733, holdup capacitors 734, and dummy load 736. Buck-boost module 731 comprises one or more switching power regulators that receive power from a power source, such as off-device power link 735, and boosts a voltage associated with the power source to a holdup voltage for holdup capacitors 734. In this example, the power source is provided at +12 VDC and the holdup capacitors 734 are driven at a higher voltage, such as over +30 VDC, although different voltages can be employed, such as 80 VDC, 125 VDC, or higher voltages on holdup capacitors 734. Buck-boost module 731 can also take the energy stored by holdup capacitors 734 and step-down the voltage to a lower voltage, such as 12 VDC for driving on-device or off-device elements using the energy stored in holdup capacitors 734. Processor 721 can communicate with buck-boost 731 to instruct buck-boost 731 to enter a buck mode or a boost mode. Buck-boost 731 can receive control signals or instructions from processor 721, such as over general purpose I/O of processor 721.

To control the flow of energy between on-device power and holdup power, flow control module 732 is employed. Flow control module 732 includes various power switching elements, such as transistor switches, analog switches, solid state switches, diodes, and the like. When external off-device power is available, such as over link 735, then flow control 732 can provide this power to on-device distribution module 733 and to buck-boost module 731 for charging holdup capacitors 734. When external off-device power is not available, then flow control 732 can allow power stored in holdup capacitors 734 and stepped-down by buck-boost module 731 to flow to on-device distribution module 733 instead of off-device power of link 735. Also, as discussed below, when excess energy remains in holdup capacitors 734 after an associated storage device of power controller 720 has had all elements powered down and data committed, then this excess energy can be directed by flow control module 732 to off-device consumers over link 735. In this manner, excess energy stored in holdup devices of power controller 720 can be used to provide power to other cards or devices during a shutdown or commit process. The commit process includes writing any in-flight write data to non-volatile memory. The non-volatile memory can include storage drives of a storage device, or can include separate non-volatile memory dedicated to power-down caching of in-flight data. If the associated storage device of power controller 720 is instead removed from a chassis or connector, then this excess energy of holdup capacitors 734 can be safely bled off using dummy load 736. Flow control module 732 can receive control signals or instructions from processor 721, such as over general purpose I/O of processor 721.

On-device distribution module 733 includes various power flow and switching circuitry to direct electrical power to various elements of a storage device, such as storage drives, PCIe switches, and the like, over links 725. Links 725 can comprise the various power links discussed herein for the various devices. On-device distribution module 733 includes various power switching elements, such as transistor switches, analog switches, solid state switches, diodes, and the like. On-device distribution module 733 can receive control signals or instructions from processor 721, such as over general purpose I/O of processor 721.

Dummy load 736 can include resistive loads, such as heat dissipating electrical elements to bleed off excess energy of a holdup circuit, such as holdup capacitors 734. In some examples, dummy load 736 comprises a high-output light emitting diode (LED) which can efficiently bleed off excess energy using the light output of the LED. This LED can also indicate that energy still remains in the holdup circuit, warning a user of a particular storage device that potentially dangerous or damaging voltages and energies might still exist on a storage device. When a card is inserted into a connector, the LED is normally off. However, when a storage device is removed from a connector, then the LED would be instructed to illuminate and indicate that energy was being bled off of the storage device using the LED. When the LED finally turned off, due to insufficient energy remaining on a card, then the operator can know that dangerous or damaging voltages and energies no longer exist on the storage device. If the LED cannot bleed all of the energy quickly enough, then additional resistive elements can be employed in parallel to assist the LED indicator. Cover plates for the various higher voltage elements, such as capacitors, of system 700 can be employed.

Figure 8:
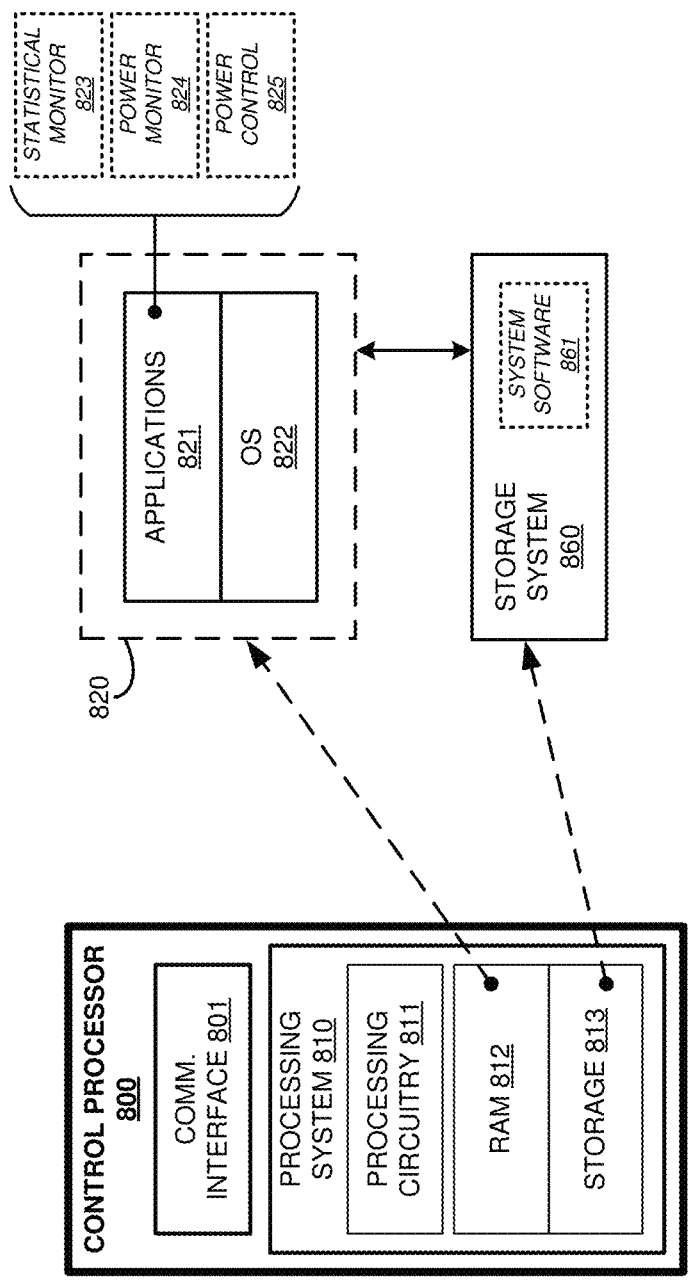
FIG. 8 illustrates an example control system in an implementation.
Figure 9:
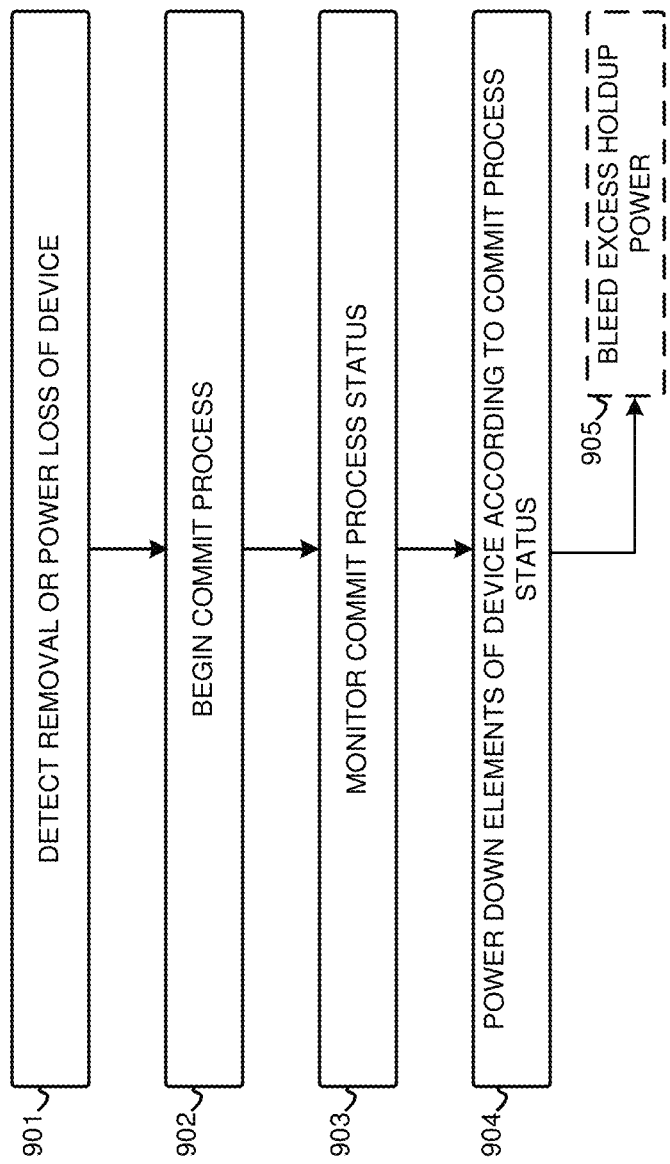
FIG. 9 illustrates an example operation of a control system in an implementation.

To discuss the various power holdup, distribution, and handling operations of FIG. 7 as well as the various power controllers of the devices herein, FIGS. 8-9 are included. FIG. 8 discusses removal of a device from a connector. FIG. 9 discusses the handling of power loss from a device, including from removal.

FIG. 8 is s block diagram illustrating processing system 800. Processing system 800 illustrates an example of any of the power control modules or device processors discussed herein, such as power control module 621 or processor 620 of FIG. 6, or power controller 720 of FIG. 7. In addition, processing system 800 can be illustrative of any processing system a storage device discussed herein.

Control processor 800 includes communication interface 801 and processing system 810. Processing system 810 includes processing circuitry 811, random access memory (RAM) 812, and storage 813, although further elements can be included. Example contents of RAM 812 are further detailed in RAM space 820, and example contents of storage 813 are further detailed in storage system 860.

Processing circuitry 811 can be implemented within a single processing device but can also be distributed across multiple processing devices or sub-systems that cooperate in executing program instructions. Examples of processing circuitry 811 include general purpose central processing units, microprocessors, application specific processors, and logic devices, as well as any other type of processing device. In some examples, processing circuitry 811 includes physically distributed processing devices, such as cloud computing systems.

Communication interface 801 includes one or more communication and network interfaces for communicating over communication links, networks, such as packet networks, the Internet, and the like. The communication interfaces can include PCIe interfaces, serial links, such as SPI links, I2C links, USB links, UART links, or one or more local or wide area network communication interfaces which can communicate over Ethernet or Internet protocol (IP) links. Communication interface 801 can include network interfaces configured to communicate using one or more network addresses, which can be associated with different network links. Examples of communication interface 801 include network interface card equipment, transceivers, modems, and other communication circuitry.

RAM 812 and storage 813 together can comprise a non-transitory data storage system, although variations are possible. RAM 812 and storage 813 can each comprise any storage media readable by processing circuitry 811 and capable of storing software. RAM 812 can include volatile and nonvolatile, removable and non-removable media implemented in any method or technology for storage of information, such as computer readable instructions, data structures, program modules, or other data. Storage 813 can include non-volatile storage media, such as solid state storage media, flash memory, phase change memory, or magnetic memory, including combinations thereof. RAM 812 and storage 813 can each be implemented as a single storage device but can also be implemented across multiple storage devices or sub-systems. RAM 812 and storage 813 can each comprise additional elements, such as controllers, capable of communicating with processing circuitry 811.

Software stored on or in RAM 812 or storage 813 can comprise computer program instructions, firmware, or some other form of machine-readable processing instructions having processes that when executed a processing system direct control processor 800 to operate as described herein. For example, software can drive processor 800 to monitor operating statistics and status for various storage devices and other modules, monitor power status for the cards and modules, and instruct power circuitry to control flow of holdup power or operational power, control power down or reset of various on-board storage drives, control performance throttling, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

RAM space 820 illustrates a detailed view of an example configuration of RAM 812. It should be understood that different configurations are possible. RAM space 820 includes applications 821 and operating system (OS) 822. Software applications 823-825 each comprise executable instructions which can be executed by processor 800 for operating a power controller or other circuitry according to the operations discussed herein. Specifically, statistical monitor 823 monitors usage status or usage statistics for elements of cards and modules. The usage statistics include data transfer rates of links, error rates of links, a cumulate number of errors of links, among other statistics. The usage statistics can be collected and stored by processor 800 in a data structure, such as a database or table and stored in storage 813, RAM 812, or other storage elements. Power monitor 824 monitors power statistics during a power up, operational, or power-down processes, power status statistics, power active status, voltage levels, phase measurements, current draw, holdup circuit status or levels, card/module insertion status, thermal levels, among other statistics. Power control 825 instructs power circuitry to power up or power down an associated drive, card, circuitry, or module responsive to statistical monitor 823 or power monitor 824, among other signals such as discrete signals monitored by associated power circuitry. Power control 825 can power up or power down a card or module responsive to data commit status of associated storage drives or other circuitry, responsive to insertion status, or other factors.

Applications 821 and OS 822 can reside in RAM space 820 during execution and operation of control processor 800, and can reside in storage system 860 during a powered-off state, among other locations and states. Applications 821 and OS 822 can be loaded into RAM space 820 during a startup or boot procedure as described for computer operating systems and applications.

Storage system 860 illustrates a detailed view of an example configuration of storage 813. Storage system 860 can comprise flash memory such as NAND flash or NOR flash memory, phase change memory, magnetic memory, among other solid state storage technologies. As shown in FIG. 8, storage system 860 includes system software 861. As described above, system software 861 can be in a non-volatile storage space for applications and OS during a powered-down state of control processor 800, among other operating software.

Control processor 800 is generally intended to represent a computing system with which at least software 861 and 821-825 are deployed and executed in order to render or otherwise implement the operations described herein. However, control processor 800 can also represent any computing system on which at least software 861 and 821-825 can be staged and from where software 861 and 821-825 can be distributed, transported, downloaded, or otherwise provided to yet another computing system for deployment and execution, or yet additional distribution.

FIG. 9 is a flow diagram illustrating a method of operating a storage device. The operations of FIG. 9 are discussed below in an exemplary storage device, such as storage device 610 of FIG. 6. It should be understood that the operations of FIG. 9 can apply to any of the drives, devices, cards or modules discussed herein, including storage drives, storage cards, and processing modules, among others. Also, the operations of FIG. 9 are discussed in the context of a local processor or power controller, such as the elements of FIGS. 6-8. It should be understood that the operations of FIG. 9 can be handled by a controller, processor, or processing system, such as controller 621 or processor 620 of FIG. 6, including combinations and variations thereof.

In FIG. 9, processor 620 detects (901) removal of device 610. This removal can include device 610 being physically removed from an associated connector. In addition to detecting removal of device 610, processor 620 can also detect power loss for a source power, such as provided over power link 623. Power loss flags or alerts can also be provided over any of sideband link 649 or PCIe link 640. In some examples, power loss of link 623 can be interpreted as a physical removal of device 610. In other examples, various removal detection methods can be employed, such as pull-down or pull-up pins associated with device 610 which can indicate physical mating of device 610 with a socket or connector of an associated connector.

Once removal or power loss is detected, processor 620 begins (902) a commit process for device 610. The commit process ensures that data currently in-flight for storage into any of storage drives 611 is properly written to an associated storage drive 611 or to a temporary non-volatile memory of device 610 during a power hold-up period. Data that has been received over PCIe switch 612 can be written to the associated storage drive 611 without loss of that data.

The commit process can include initially powering down PCIe switch 612 but still providing power to a buffer associated with device 610 which data in-flight is placed before the data is committed to non-volatile memory, such as ones of storage drive 611. The buffers can be included in each storage drive 611, or in separate data buffer components. Processor 620 monitors (903) the commit process for each storage drive 611 and powers down individual ones of storage drives 611 once all write data has been committed to non-volatile storage of storage drive 611.

Thus, processor 620 powers down (904) elements of device 610 according to the commit process status. Namely, PCIe switch 612 is first powered down after power loss is detected, and individual ones of storage drives 611 are powered down as each completes an associated commit process for buffered write data. Once all write data has been committed to non-volatile memory, processor 620 can power further elements such as processor 620 itself or power controller 621.

During the commit and power down process described above, holdup circuit 622 provides power to the individual elements of device 610. Processor 620 communicates with power controller 621, such as over link 630 or another link, and instructs power controller 621 to selectively enable/disable power for the various elements of device 610. Power controller 621 can employ solid state switches, transmission gates, solid state analog switches, transistor switches, or other power switching elements to selectively provide or remove power for the various elements of device 610. Power controller 621 can also provide an input power status to processor 620 to indicate when input power is available.

Once input power is regained, such as by re-insertion of device 610 into a connector or after recovery of a source power, power controller 621 can apply power to processor 620. Processor 620 can proceed through a startup process, such as a boot process, and then instruct power controller 621 to selectively apply power to the other various elements of device 610. These various elements of device 610 can be powered up in a predetermined sequence to reduce inrush current over link 623. The predetermined sequence can include powering on individual ones of storage drives 611 in a sequential manner, then powering on PCIe switch, among other sequences.

Once the commit process is complete, processor 620 can operate in at least two different manners depending upon if the device is removed or not to cause the power loss. When the power loss status is not due to device removal, such as due to loss of source power while the card remains seated in an associated connector, then power controller 621 might redistribute excess holdup power. Excess power redistribution can occur in systems that support bidirectional PCIe power flow, or in customized systems with power provided separate from a PCIe interface. This excess holdup power comprises energy remaining in any associated holdup circuit, such as holdup capacitors. A flow control circuit can direct energy from the holdup circuit to a link that feeds power off-device. In some examples, such as in FIG. 7, the holdup circuit comprises an array of capacitors which are charged to a higher voltage than desired for an operating voltage of the storage device. In this case, a buck-boost converter can be operated in a step-down mode to convert the high voltage of the holdup capacitors to a lower operating voltage, and a power flow control circuit can direct this energy too off-device destinations or power busses. The redirected power can be used by other storage devices to increase holdup time of the other storage devices to complete shut down operations or data commit operations. A measurement of remaining energy in the holdup circuit can be monitored by processor 620 and information related to the remaining energy can be provided off-device along with the power itself. In some examples, processor 620 is also powered down and thus only power flow, voltage step down, and holdup portions of power controller 621 are active during the power redistribution.

When the power loss is due to storage device removal, then power controller 621 can bleed (905) excess power of the holdup circuit. As discussed in FIG. 7, this power bleed can include resistive or LED elements, and ensures that dangerous or damaging energy or high voltage is not remaining on a storage device after removal from a connector.

In further examples, additional power control features can be included. These additional features can include where processor 620 monitors status of all storage drives 611 and also optionally monitors usage status or usage statistics for elements of storage device 610. These elements include any of storage drives 611, PCIe switch 612, processor 620, power control node 621, holdup circuitry 622, or any of the various links and communication interfaces. The status and usage statistics include data transfer rates of PCIe links, error rates of PCIe links, retry rates, signal qualities, a cumulate number of errors of PCIe links, storage device insertion status, thermal levels of elements of device 610, among other statistics, including those statistics received from another storage device or from a host. The status and usage statistics can include inrush statistics provided by power controller 621, such as during a power-up process or storage device 610. The status and usage statistics can include power status statistics monitored by power controller 621, such as a power active status, voltage levels, phase measurements, current draw, holdup circuit status or level, among other statistics. The status and usage statistics can be collected and stored by processor 620 in a storage system associated with processor 620, such as RAM, flash memory, or other storage systems. The status and usage statistics can be employed in power down and power up processes such as discussed herein.

Processor 620 can detect problems with any of storage drives 611. These problems can be for any of storage drives 611, and can include lack of response to storage operations or sideband signaling, an error rate above an error threshold, a change in PCIe throughput below a throughput threshold, PCIe retry rates above a threshold level, power loss detected, or other problems. Any of the status or usage statistics can be employed to detect an issue or problem with any of the storage drives. Responsive to detecting a problem with any of the storage drives, processor 620 can restart elements of storage device 610. Specifically, processor 620 can restart ones of storage drives 611 to attempt to correct or eliminate any problem detected. Additionally, each of storage drives 611 is isolated on an associated PCIe interface from a host PCIe interface by PCIe switch 612. Processor 620 can reset or restart one or more of storage drives 611 and keep any associated host status unchanged regarding instantiation of the storage drives, a host power status of the storage drives, or factors that might be apparent to a host system or peripheral system into which storage device 610 is inserted. Thus, the entirety of storage device 610 does not need to stop normal operation when ones of storage drives 611 are experiencing problems or issues, such as ones of storage drives 611 failing to respond to host storage operations or commands.

To restart an individual storage drive, processor 620 can instruct power controller 621 to cycle power for the associated storage drive. In other examples, a reset command is issued to the affected storage drive. In yet other examples, a PCIe command is issued to the affected storage drive which commands a reset of that particular storage drive. Processor 620 can read and store a state or PCIe status information for the affected storage drive and reconfigure that storage drive with the stored state or PCIe status information once reset. The state or PCIe status information can include an identity of the storage drive, an address of the storage drive, a logical unit or logical drive status of the storage drive, among other status, configurations, and information.

During the restart process, any host system which is communicatively coupled to storage device 610 can be shielded from the restart process so that the host system is not aware of the failure, problem, or associated restart. PCIe switch 612 can provide some measure of isolation of PCIe interfaces 641 from PCIe 640 which is coupled to a host system or peripheral system. Also, during the restart process, storage device 610 might elect among two or more behaviors when host storage operations are received for the storage drive which is being restarted. In a first example, storage device 610 might just not respond to storage operations received over PCIe interface 640 for the storage drive being restarted. This lack of response can force retries in the host system, which can accumulate and eventually cause an error condition in the host system for that particular storage drive. In a second example, one or more buffer circuits can be included on storage device 610 that can accept storage operations for any of storage drives 611 while a storage drive is being reset or restarted in-situ. This buffer can be included in any of the other storage drives or in separate storage circuitry, such as non-volatile memory device.

If the reset process fails to resolve the problem with the particular storage drive, then that storage drive can be powered down and/or the associated host system can be notified of a failure or problem with the affected storage drive. Remaining storage drives can continue to operate over associated PCIe interface 641 and PCIe interface 640 during the reset/power cycle process for an affected storage drive, and when any particular storage drive fails. Thus, enhanced storage operation can be achieved by having continued operation of storage device 610 during individual storage drive failures, and those individual drive failures can be resolved by storage device 610 itself without host system involvement or interruption by using the process described above.

Processor 620 can monitor usage status or usage statistics for elements of device 610. These elements include any of storage drive 611, PCIe switch 612, processor 620, power control node 621, holdup circuitry 622, or any of the various links and communication interfaces. The usage statistics include data transfer rates of PCIe links, error rates of PCIe links, a cumulative number of errors of PCIe links, storage device insertion status, thermal levels of elements of storage device 610, among other statistics, including those statistics received from another storage device or a host. The usage statistics can include inrush statistics provided by power controller 621, such as during a power-up process or storage device 610. The usage statistics can include power status statistics monitored by power controller 621, such as a power active status, voltage levels, phase measurements, current draw, holdup circuit status or level, among other statistics. The usage statistics can be collected and stored by processor 620 in a storage system associated with processor 620, such as RAM, flash memory, or other storage systems.

Processor 620 can modify performance of elements of storage device 610 according to at least the usage statistics. For example, the usage statistics can also be used to control power usage during normal operation of storage device 610. When usage statistics indicate that a particular storage drive 611 is dormant or is handling a quantity of transactions that fall below a transaction threshold level, then that storage drive can have an associated operational property modified. This property can include reducing a speed or interface property of a PCIe interface. Processor 620 can disable a subset of the PCIe lanes of a particular storage drive 611 to reduce power consumption of that storage device, such as by reducing the number of active lanes from x4 to x1. Processor 620 can reduce a bus speed or clock speed of a PCIe interface of storage drive 611, such as by reducing a throughput from 8 GB/s to 4 GB/s or 1 GB/s. Other performance scaling can occur based on the usage of elements of storage device 610 as monitored by processor 620. A host status can be maintained during the modification of performance of elements of storage device 610 to prevent action and awareness of fluctuations in storage device performance due to statistically-driven modifications.

Thermal sensors, on-die or on-chip temperature sensors, or discrete thermal measurement circuitry can be employed to monitor thermal status of the elements of storage device 610. The performance of ones of storage drives 611 can be increased or decreased on-the-fly according to thermal levels and PCIe switch 612 can provide a level of abstraction of storage drives 611 from host PCIe interface 640. In this manner, a PCIe speed, width, or lane allocation can be altered for any of storage drives 611 without host system involvement or in-situ by processor 620.

These usage and performance statistics can be provided to a processing module or host for further collection, storage, and processing. Furthermore, instructions for power up/down and performance scaling can be received from a processing module or host based at least on these provided statistics, among other operations. Additionally, the usage statistics can be employed to selectively power down elements of a particular storage device, such as powering down storage drives 611 when dormant or when activity levels drop below threshold levels according to the usage statistics. Many components or storage drives incorporate low power modes, such as idle modes. These idle modes can be enabled according to the usage statistics. However, even when in idle or low power modes, these storage drives still consume power. Processor 620 can monitor when these storage drives, or other storage device elements, fall below a threshold activity level even if in the idle mode, and instruct power control node 621 to remove power from the associated storage device elements. In some examples, when all storage drives 611 of a storage device are powered down due to usage statistics for the storage drives falling below a threshold usage level, then any associated PCIe switch on the storage device can also be powered down. Power up of the PCIe switch can occur when usage statistics rise above a threshold usage level, which can be a different usage level than the power down threshold.

In further examples, power control node 621 can include various power supply electronics, such as power regulators, step up converters, step down converters, buck-boost converters, power factor correction circuits, among other power electronics. Typically, these power electronics must be tuned ahead of time for a particular load application, such as a maximum load anticipated for a particular storage device. Various magnetic, solid state, and other electronic components are typically sized according to the maximum power draw for a particular application, and these components are permanently affixed to an associated circuit board, such as by soldering or sockets. In FIG. 7, the usage statistics are monitored to establish a present power draw for the various power electronics, such as a current supplied at a certain voltage by a buck-boost converter.

The various parameters of the power electronics can be altered according to the present power loading, such as by selecting among various magnetic components, such as inductors or transformers, adjusting resistive or capacitive components according to the present power loading, and the like. The alterations or adjustments can enable or disable various electronic components, such as using analog switches, low 'on' resistance transistor switches, or other selection methods. The alterations or adjustments can allow for power control node 621 to operate in a desired efficiency range, such as 90-98% efficiency. As the power load changes due to different usage of the various components of a storage device, the pre-selected electrical components might lead to a lower efficiency. Based on these current usage statistics or power loading, processor 620 can instruct power control node 621 to alter component selections, modulation frequencies, pulse-width modulation factors, resistive/capacitive/inductive component usage, among other elements to maintain efficiency of a particular power electronic circuit in the desired efficiency range. These alterations or adjustments can bring phase margins or gain margins of the associated power electronics into the desired ranges. The phase and gain can be monitored by elements of power control node 621 or processor 620, including associated circuit elements, such as current sense resistors.

In some examples, the usage statistics, among other factors, are used to modify operating parameters of associated storage device power electronics. However, these modifications might be used only when power loss is detected, to maximize efficient use of holdup circuitry. For example, if holdup capacitors are employed, the voltage provided by the holdup capacitors can drop as energy is drained from the holdup capacitors. As the voltage drops, the efficiency of a buck-boost converter might be reduced as well, since the input voltage provided by the holdup capacitors might fall below a threshold voltage level for efficient use of analog components related to the buck-boost converter. This holdup voltage can be monitored or be used as an input to an efficiency maximization circuit, which alters parameters or components associated with the buck-boost converter to ensure a desired or predetermined efficiency range or level is maintained. Once the voltage drops below a threshold operational level, the buck-boost converter can be disabled to prevent operating within an undesirably low voltage range, such as dictated by input voltage requirements of the particular power electronic components employed.

FIGS. 10-12 illustrate various other form factors that include the enhanced storage elements discussed herein. Elements of FIGS. 10-12 can correspond to similar elements of FIGS. 1-8, although variations are possible. Elements of FIGS. 10-12 can be used to implement examples shown in FIGS. 1-8.

The cards and drives included in Elements of FIGS. 10-12 can optionally include stacked arrangements of M.2 SSDs using two-tier M.2 connector configurations that form a stacked or tiered arrangement, with an SSD on a bottom tier and an SSD on an upper tier. The upper tier can employ taller M.2 sockets or elevated M.2 sockets as compared to the lower tier. The lower M.2 SSDs are positioned underneath the upper M.2 SSDs. The stacked M.2 SSDs form a compact stackup arrangement which can fit into a small stackups and form factors. In these examples, the M.2 SSDs comprise either 110 millimeter (mm) or 80 mm sized M.2 SSDs. M.2 end supports hold and structurally supports an end of each M.2 SSD which is opposite of the connector end. Other sizes of M.2 SSDs can be included, such as lengths of 16, 26, 30, 38, 42, 60, 80 and 110 mm and widths of 12, 16, 22 and 30 mm.

The cards and drives discussed in FIGS. 10-12 can also include external PCIe ports and internal PCIe ports, as well as internal and external USB ports. The external PCIe ports can comprise Quad Small Form Factor Pluggable (QSFFP) or QSFP/QSFP+ jacks or mini-SAS HD jacks over which PCIe signaling is carried when associated cables are employed. Mini-SAS HD ports can be employed for cluster interconnect to other cards and can drive 12 Gb/s, which can support PCIe Gen 3 traffic.

Turning now to FIG. 10, a FHHL (full-height half-length) PCIe expansion card 1005 is shown. Three views are included in FIG. 10, with first view 1000 showing a fully assembled card 1005. Second view 1001 shows card 1005 with heatsink plate 1011 removed to highlight components underneath heatsink plate 1011. Third view 1002 shows another orientation of card 1005 to highlight components on the 'internal' side of the card.

Card 1005 includes at least one circuit board 1010, heatsink plate 1011, edge connector 1020, PCIe switch circuit 1032, power control circuitry 1033, four (4) M.2 SSDs 1040, M.2 connectors 1041, and slot cover 1013, among other elements. Several other connectors are included on card 1005, such as external PCIe connectors 1022, external USB connector 1025, internal PCIe connectors 1023, and internal USB connector 1024. M.2 end supports 1042 are also included to support an end of each M.2 SSD opposite of an associated M.2 connector. Internal power port 1024 is also included in some examples.

Internal and external USB connectors 1024-1025 comprise USB type A sockets, but can instead comprise any version of USB and connector type suitable for USB communications. These communications include management, control, status, and sideband communications, as discussed herein for sideband 649 or other communications. Internal PCIe connectors 1023 comprise one or more PCIe links of any associated PCIe width. PCIe connectors 1023 can be employed to couple card 1005 to other cards in the same host system or host enclosure over PCIe links. These PCIe links can be employed for load balancing, data transfer, redundancy, dual-port features, or other purposes, including combinations thereof. External PCIe connectors 1022 can be employed to couple card 1005 to other host systems, or to other cards in the same or different host systems. Each of PCIe links associated with connectors 1022-1023 are provided by PCIe switch circuit 1032. In some examples, a main PCIe interface is provided over edge connector 1020 to an associated host, along with power and sideband signaling, such as seen in FIG. 6 for links 623, 640, and portions of link 649. Auxiliary PCIe interfaces, such as link 660 in FIG. 6, can be provided over any of PCIe connectors 1022-1023.

When inserted into a PCIe slot of a host system via edge connector 1020, such as a motherboard or daughterboard of a computer or server system, card 1005 can provide data storage capacity to the host system. Data can be stored and retrieved from storage media associated with SSDs 1040. PCIe switch circuit 1032 provides PCIe interfacing to the host system as well as PCIe fan-out to each individual M.2 SSD and auxiliary PCIe interface. Power control circuity is also included with one or more energy storage arrays (such as the capacitors pictured in FIG. 10) to provide holdup power upon loss of power to card 1005 or removal of card 1005 from a host. In-flight data or unwritten data can be committed to non-volatile storage media, such as M.2 SSDs 1040, upon loss of input power via the holdup power.

Turning now to FIG. 11, a FHFL (full-height full-length) PCIe expansion card 1105 is shown. Three views are included in FIG. 11, with first view 1100 showing a fully assembled card 1105. Second view 1101 shows card 1105 with heatsink plate 1111 removed to highlight components underneath heatsink plate 1111. Third view 1102 shows another orientation of card 1105 to highlight components on the 'internal' side of the card.

In contrast with FIG. 10, card 1105 includes six M.2 devices instead of four, as well as associated M.2 connectors. Moreover, further internal and external PCIe ports can be include in card 1105. Card 1105 includes at least one circuit board 1110, heatsink plate 1111, edge connector 1120, PCIe switch circuit 1132, power control circuitry 1133, six (6) M.2 SSDs 1140, M.2 connectors 1141, and slot cover 1113, among other elements. Several other connectors are included on card 1105, such as external PCIe connectors 1122, external USB connector 1125, internal PCIe connectors 1123, and internal USB connector 1124. M.2 end supports 1142 are also included to support an end of each M.2 SSD opposite of an associated M.2 connector. Internal power port 1124 is also included in some examples.

Internal and external USB connectors 1124-1125 comprise USB type A sockets, but can instead comprise any version of USB and connector type suitable for USB communications. These communications include management, control, status, and sideband communications, as discussed herein for sideband 649 or other communications. Internal PCIe connectors 1123 comprise one or more PCIe links of any associated PCIe width. PCIe connectors 1123 can be employed to couple card 1105 to other cards in the same host system or host enclosure over PCIe links. These PCIe links can be employed for load balancing, data transfer, redundancy, dual-port features, or other purposes, including combinations thereof. External PCIe connectors 1122 can be employed to couple card 1105 to other host systems, or to other cards in the same or different host systems. Each of PCIe links associated with connectors 1122-1123 are provided by PCIe switch circuit 1132. In some examples, a main PCIe interface is provided over edge connector 1120 to an associated host, along with power and sideband signaling, such as seen in FIG. 6 for links 623, 640, and portions of link 649. Auxiliary PCIe interfaces, such as link 660 in FIG. 6, can be provided over any of PCIe connectors 1122-1123.

When inserted into a PCIe slot of a host system via edge connector 1120, such as a motherboard or daughterboard of a computer or server system, card 1105 can provide data storage capacity to the host system. Data can be stored and retrieved from storage media associated with SSDs 1140. PCIe switch circuit 1132 provides PCIe interfacing to the host system as well as PCIe fan-out to each individual M.2 SSD and auxiliary PCIe interface. Power control circuity is also included with one or more energy storage arrays (such as the capacitors pictured in FIG. 11) to provide holdup power upon loss of power to card 1105 or removal of card 1105 from a host. In-flight data or unwritten data can be committed to non-volatile storage media, such as M.2 SSDs 1140, upon loss of input power via the holdup power.

Turning now to FIG. 12, a 2.5 inch form factor storage drive 1205 is shown. Four views are included in FIG. 12, with first view 1200 showing a fully assembled drive 1205 with a top cover removed to highlight internal components. Second view 1201 shows drive 1205 with M.2 SSDs removed to highlight components underneath the M.2 SSDs. Third view 1202 shows a bottom side of drive 1205. Fourth view 1203 shows a cross-sectional internal view of drive 1205. Drive 1205 communicates with a host system over a U.2 connector 1215. U.2 connector 1215 carries PCIe signaling or NVMe signaling, and can be referred to as an SFF-8639 connector interfaces in some examples. U.2 connector 1215 can carry one or more PCIe lanes.

Drive 1205 includes three or more M.2 SSD devices 1240, as well as associated M.2 connectors 1221. Drive 1205 includes chassis 1211, at least one circuit board 1210, heat spreader plate 1213, U.2 connector 1215, PCIe switch circuit 1232, six (6) M.2 SSDs 1240, M.2 connectors 1241, among other elements. M.2 end supports are also included to support an end of each M.2 SSD opposite of an associated M.2 connector. Auxiliary port 1225 is also included in some examples, and can carry sideband signaling, power, or PCIe signaling.

Each PCIe link associated with connectors 1221 and U.2 connector 1215 are provided by PCIe switch circuit 1232, which is shown as hidden below heat spreader plate 1213. In some examples, a main PCIe interface is provided over U.2 connector 1215 to an associated host, along with power and sideband signaling, such as seen in FIG. 6 for links 623, 640, and portions of link 649. Auxiliary PCIe interfaces, such as link 660 in FIG. 6, can be provided over any of connector 1225 or other connectors.

When connected to a cable or host system via U.2 connector 1215, such as a motherboard or daughterboard of a computer or server system, drive 1205 can provide data storage capacity to the host system. Data can be stored and retrieved from storage media associated with SSDs 1240. PCIe switch circuit 1232 provides PCIe interfacing to the host system as well as PCIe fan-out to each individual M.2 SSD and auxiliary PCIe interface. Power control circuity is also included with one or more energy storage arrays to provide holdup power upon loss of power to drive 1205 or removal of drive 1205 from a host. In-flight data or unwritten data can be committed to non-volatile storage media, such as M.2 SSDs 1240, upon loss of input power via the holdup power.

Although only three SSDs are included in FIG. 12, further M.2 SSDs can be included in a two-tier stacked configuration mentioned herein. In this two-tier stacked configuration, each connector 1221 would comprise an upper M.2 connector portion and a lower M.2 connector portion, so that six M.2 SSDs could be included into drive 1205. In these examples, shorter M.2 SSD devices might be employed, such as less than 80 mm lengths. Or a lower tier might include shorter than 80 mm M.2 SSD devices, and an upper tier can include 80 mm (or longer) M.2 SSD devices. In yet further examples, heat spreader 1213 and PCIe switch circuitry 1232 can be located elsewhere, such as on an opposite side of circuit board 1210, and 80 mm six M.2 SSDs can be employed in a stacked arrangement.

Figure 13:
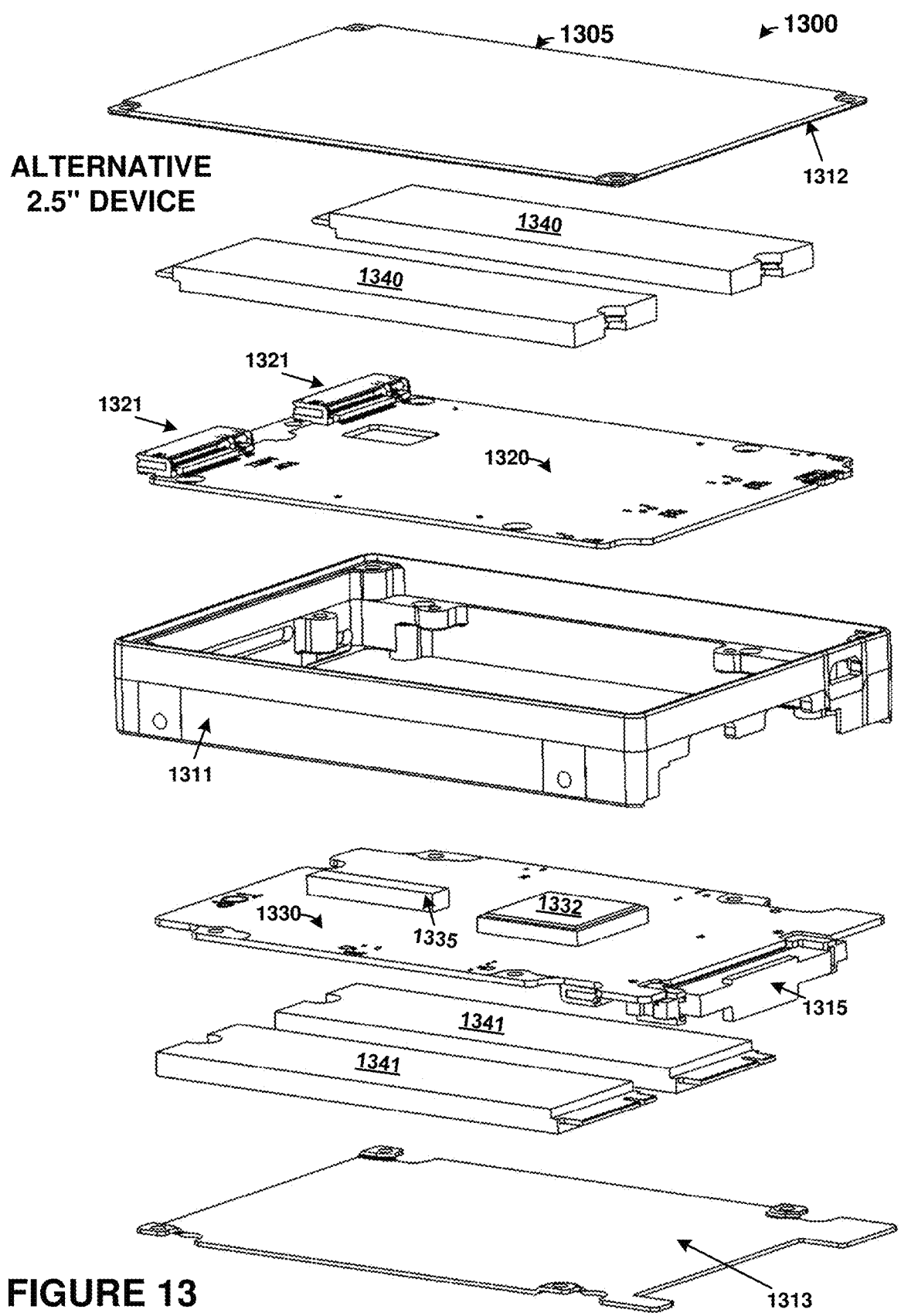
FIG. 13 illustrates example storage device implementations.

FIG. 13 illustrates another example storage device implementation. FIG. 13 illustrates exploded view 1300 of storage device 1305. View 1300 orients a perspective of device 1305 from a top side. View 1300 can include similar elements as storage drive 110 of FIGS. 1-5, however variations are possible. These elements include top cover 1312, top memory devices 1340, top circuit board 1320, chassis 1311, bottom circuit board 1330, bottom memory devices 1341, PCIe switch circuit 1332, and bottom cover 1313. Omitted from view 1300 for clarity are supports, fasteners, as well as some circuit board details and circuitry elements.

Chassis 1311, top cover 1312, and bottom cover 1313 each can comprise various materials such as metals, alloys, polymers, carbon composites, or other materials. In some examples, chassis 1311, top cover 1312, and bottom cover 1313 each comprise aluminum materials. The enclosure of storage drive 1305 can include chassis 1311, top cover 1312, and bottom cover 1313, along with further elements. Sealing features, such as gaskets or seals might be included to reduce ingress of gasses, liquids, or solids into an internal portion of storage drive 1305 formed by the enclosure. Chassis 1311, top cover 1312, and bottom cover 1313 can also be configured to conduct heat from any of the elements enclosed therein to the external environment, such as ones of memory cards 1340-1341.

Circuit boards 1320 and 1330 each comprise assemblies of various circuitry, connectors, materials, interconnect, coatings, markings, fastener features, and other elements. Typically, circuit boards 1320 and 1330 each comprise an individual printed circuit board as a base onto which various components are mounted and into which electrical or optical interconnect is formed. Circuit boards 1320 and 1330 each can be fastened to chassis 1311 for structural support and vibration resiliency. Circuit board 1320 includes a connector in this example to mate with circuit board 1330 via connector 1335. One or more connectors can be employed in further examples. Circuit board connector 1335, as well as a mating connector on circuit board 1320 carries supply power and the PCIe signaling between board 1330 to board 1320, along with other signaling and combinations thereof.

The circuit board connectors are configured to carry power and signals between the boards. The signaling comprises PCIe signaling, sideband signaling, control signaling, discrete signaling, digital signaling, or analog signaling, among other signaling. The power includes device power for powering storage cards 1340-1341 as well as for other circuit components on each board. Typically, input power is provided from a host system or other power source via main connector 1315 to bottom circuit board 1330. A power control circuitry is employed on bottom circuit board 130 that distributes the input power to the various components of circuit board 1330 via signaling associated with circuit board 1330. Additionally, the power control circuitry of circuit board 1330 distributes this input power over one or more of the internal connectors (i.e. circuit board connector 1335) to circuit board 1320 over an associated connector on circuit board 1320. The power control circuitry can include power conditioning, filtering, conversion, and handling circuitry. Various voltages can be employed and converted among. Circuit board 1320 can include further power control circuitry. In some examples, holdup power is stored within a capacitor array on circuit board 1330 or 1320 as discussed herein.

Figure 14:
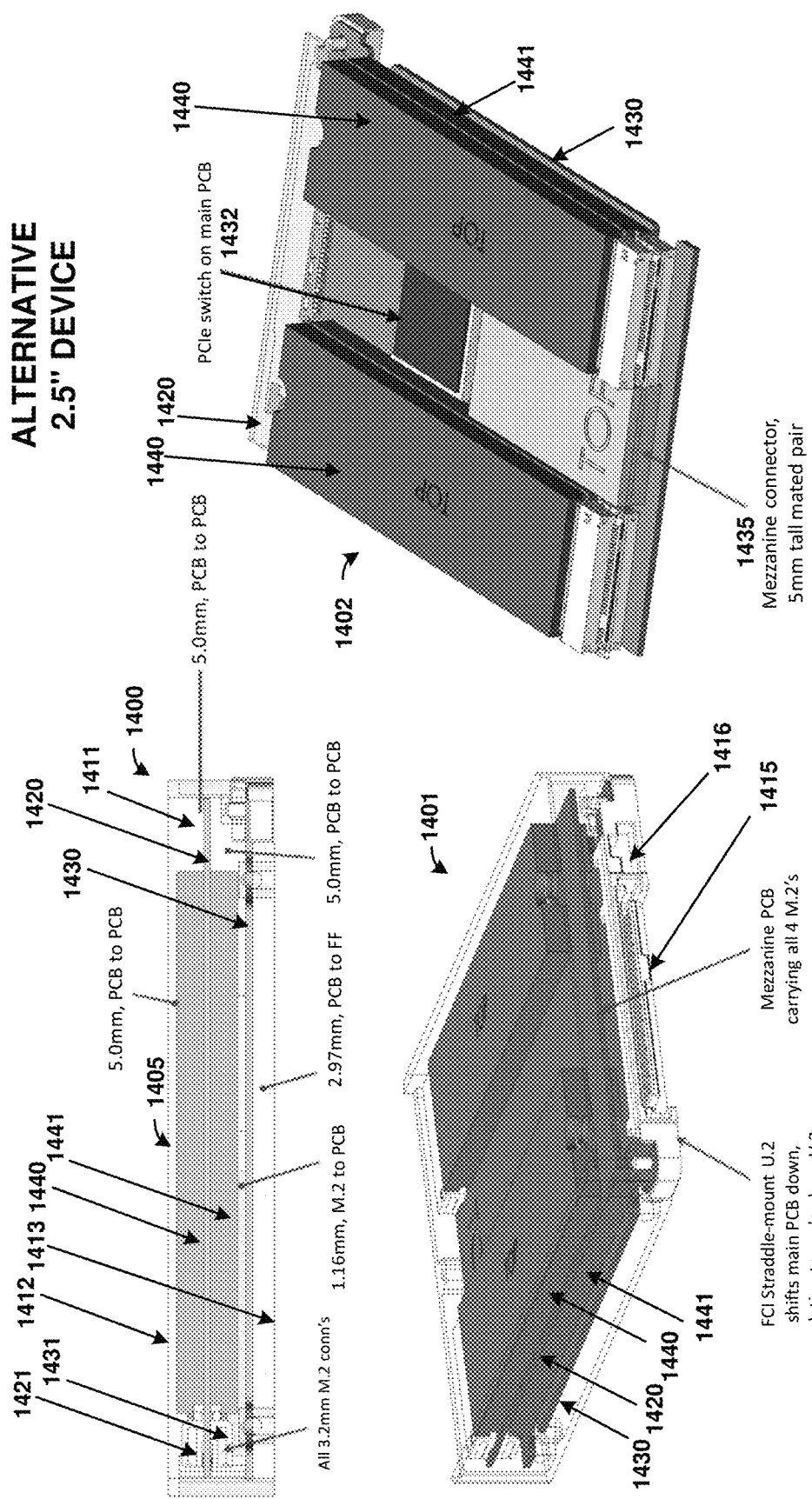
FIG. 14 illustrates example storage device implementations.

Turning now to FIG. 14, a 2.5 inch form factor storage drive 1405 is shown. Three views are included in FIG. 14, with first view 1400 showing a cross sectional view of a fully assembled drive 1405 to highlight internal components. Second view 1401 shows an isometric view of the fully assembled drive 1405. Third view 1402 shows a circuit board internal view of drive 1405. Drive 1405 communicates with a host system over a U.2 connector 1415. U.2 connector 1415 carries PCIe signaling or NVMe signaling. U.2 connector 1415 can carry one or more PCIe lanes.

Drive 1405 includes four M.2 SSD devices 1440-1441 that are all positioned onto circuit board 1420, as well as associated M.2 connectors 1421 and 1431. Four 80 mm length SSDs are included in FIG. 14. In FIG. 14, shorter M.2 SSD devices might be employed, such as less than 80 mm lengths. Drive 1405 includes chassis 1411, top cover 1412, bottom cover 1413, top circuit board 1420 (also referred to as a mezzanine board), bottom circuit board 1430, U.2 connector 1415, PCIe switch circuit 1432, four (4) M.2 SSDs 1440-1441, and M.2 connectors 1421 and 1431, mezzanine connector 1435, among other elements. M.2 end supports can also be included to support an end of each M.2 SSD opposite of an associated M.2 connector. Auxiliary port 1416 is also included in some examples, and can carry sideband signaling, power, or PCIe signaling.

Each PCIe link associated with connectors 1421, 1431, and U.2 connector 1415 are provided by PCIe switch circuit 1432. In some examples, a main PCIe interface is provided over U.2 connector 1415 to an associated host, along with power and sideband signaling, such as seen in FIG. 6 for links 623, 640, and portions of link 649. Auxiliary PCIe interfaces, such as link 660 in FIG. 6, can be provided over any of connector 1416 or other connectors.

When connected to a cable or host system via U.2 connector 1415, such as a motherboard or daughterboard of a computer or server system, drive 1405 can provide data storage capacity to the host system. Data can be stored and retrieved from storage media associated with SSDs 1440 and 1441. PCIe switch circuit 1432 provides PCIe interfacing to the host system as well as PCIe fan-out to each individual M.2 SSD and auxiliary PCIe interface. Power control circuity is also included with one or more energy storage arrays to provide holdup power upon loss of power to drive 1405 or removal of drive 1405 from a host. In-flight data or unwritten data can be committed to non-volatile storage media, such as M.2 SSDs 1440 and 1441, upon loss of input power via the holdup power.

Figure 15:
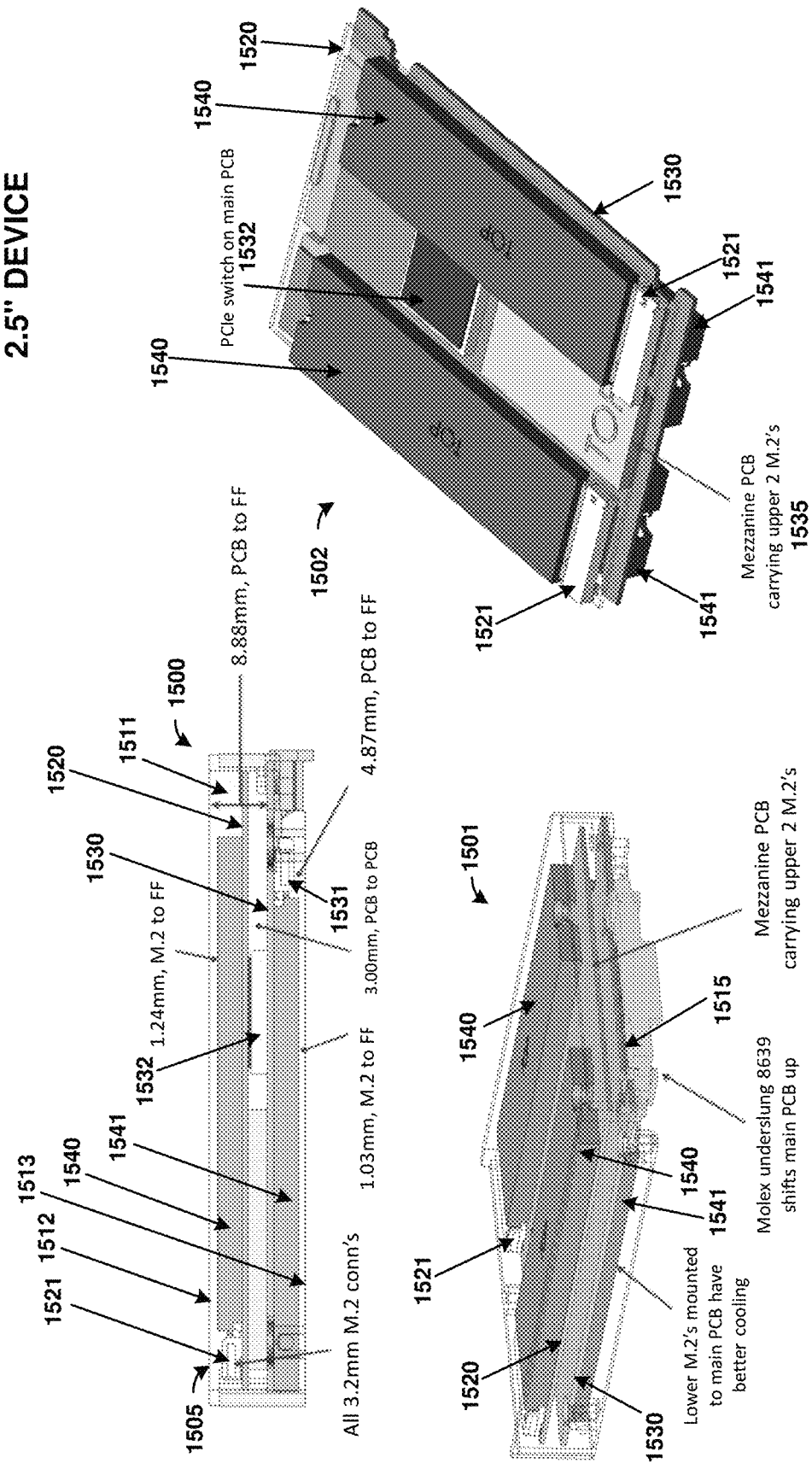
FIG. 15 illustrates example storage device implementations.

Turning now to FIG. 15, a 2.5 inch form factor storage drive 1505 is shown. Three views are included in FIG. 15, with first view 1500 showing a cross sectional view of a fully assembled drive 1505 to highlight internal components. Second view 1501 shows an isometric view of the fully assembled drive 1505. Third view 1502 shows a circuit board internal view of drive 1505. Drive 1505 communicates with a host system over a U.2 connector 1515. U.2 connector 1515 carries PCIe signaling or NVMe signaling. U.2 connector 1515 can carry one or more PCIe lanes.

Drive 1505 includes four M.2 SSD devices 1540-1541, as well as associated M.2 connectors 1521 and 1531. Two M.2 SSD devices 1540 are carried by the top circuit board 1520, and two M.2 SSD devices 1541 are carried by the bottom circuit board 1530. Four 80 mm length SSDs are included in FIG. 15. In FIG. 15, shorter M.2 SSD devices might be employed, such as less than 80 mm lengths. Drive 1505 includes chassis 1511, top cover 1512, bottom cover 1513, top circuit board 1520 (also referred to as a mezzanine board), bottom circuit board 1530, U.2 connector 1515, PCIe switch circuit 1532, four (4) M.2 SSDs 1540-1541, and M.2 connectors 1521 and 1531, mezzanine connector 1535, among other elements. M.2 end supports can also be included to support an end of each M.2 SSD opposite of an associated M.2 connector.

Each PCIe link associated with connectors 1521, 1531, and U.2 connector 1515 are provided by PCIe switch circuit 1532. In some examples, a main PCIe interface is provided over U.2 connector 1515 to an associated host, along with power and sideband signaling, such as seen in FIG. 6 for links 623, 640, and portions of link 649. Auxiliary PCIe interfaces, such as link 660 in FIG. 6, can be provided over an external connector in some examples.

When connected to a cable or host system via U.2 connector 1515, such as a motherboard or daughterboard of a computer or server system, drive 1505 can provide data storage capacity to the host system. Data can be stored and retrieved from storage media associated with SSDs 1540 and 1541. PCIe switch circuit 1532 provides PCIe interfacing to the host system as well as PCIe fan-out to each individual M.2 SSD and auxiliary PCIe interface. Power control circuity is also included with one or more energy storage arrays to provide holdup power upon loss of power to drive 1505 or removal of drive 1505 from a host. In-flight data or unwritten data can be committed to non-volatile storage media, such as M.2 SSDs 1540 and 1541, upon loss of input power via the holdup power.

Figure 16:
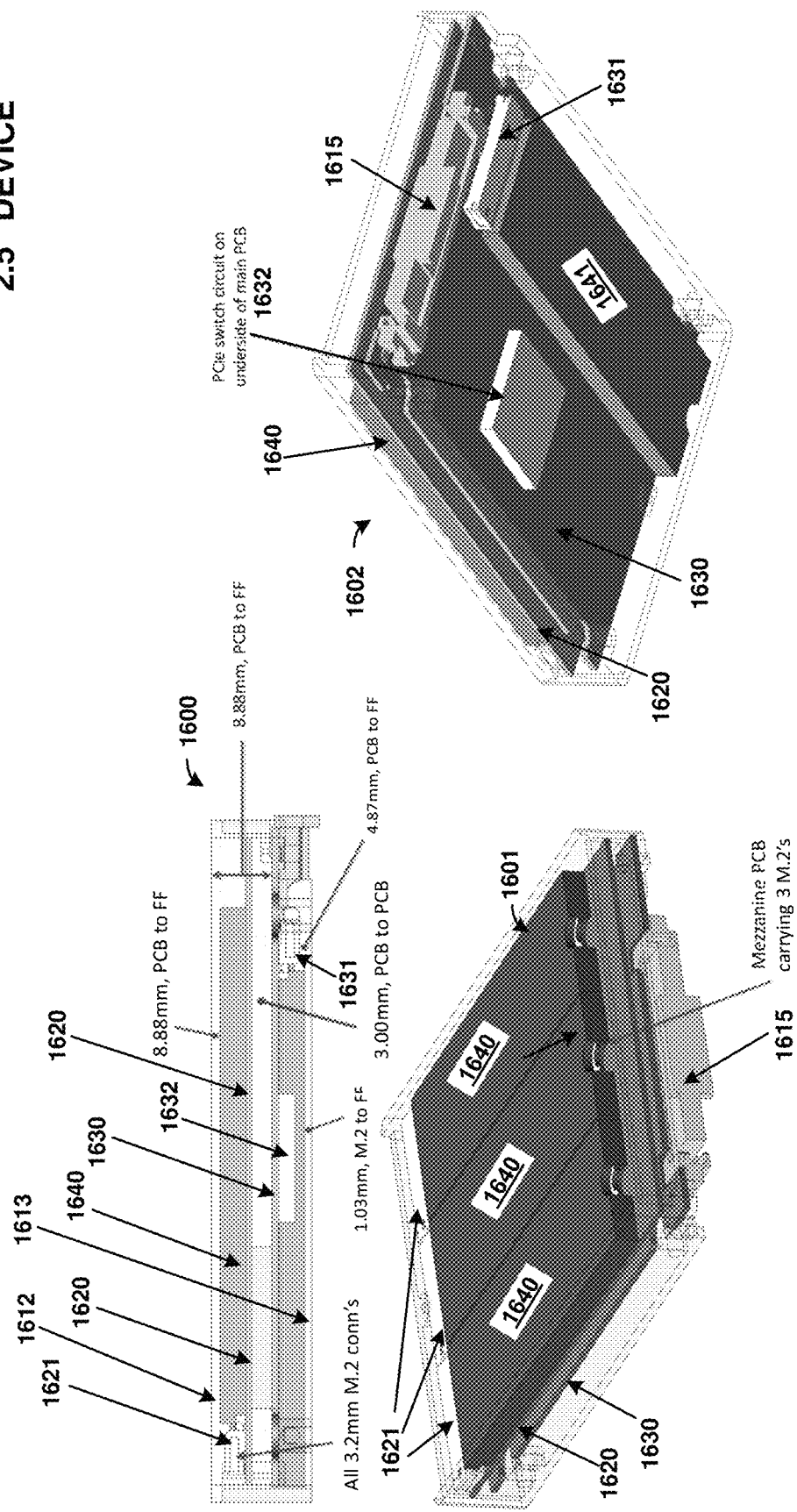
FIG. 16 illustrates example storage device implementations.

Turning now to FIG. 16, a 2.5 inch form factor storage drive 1605 is shown. Three views are included in FIG. 16, with first view 1600 showing a cross sectional view of a fully assembled drive 1605 to highlight internal components. Second view 1601 shows an isometric view of the fully assembled drive 1605. Third view 1602 shows a circuit board internal view of drive 1605. Drive 1605 communicates with a host system over a U.2 connector 1615. U.2 connector 1615 carries PCIe signaling or NVMe signaling. U.2 connector 1615 can carry one or more PCIe lanes.

Drive 1605 includes four M.2 SSD devices 1640-1641, as well as associated M.2 connectors 1621 and 1631. Three M.2 SSD devices 1640 are carried by the top circuit board 1620, and one M.2 SSD device 1641 is carried by the bottom circuit board 1630. Four 80 mm length SSDs are included in FIG. 16. In FIG. 16, shorter M.2 SSD devices might be employed, such as less than 80 mm lengths. Drive 1605 includes chassis 1611, top cover 1612, bottom cover 1613, top circuit board 1620 (also referred to as a mezzanine board), bottom circuit board 1630 (also referred to as a main board), U.2 connector 1615, PCIe switch circuit 1632, four (4) M.2 SSDs 1640-1641, and M.2 connectors 1621 and 1631, mezzanine connector 1635, among other elements. M.2 end supports can also be included to support an end of each M.2 SSD opposite of an associated M.2 connector.

Each PCIe link associated with connectors 1621, 1631, and U.2 connector 1615 are provided by PCIe switch circuit 1632. In some examples, a main PCIe interface is provided over U.2 connector 1615 to an associated host, along with power and sideband signaling, such as seen in FIG. 6 for links 623, 640, and portions of link 649. Auxiliary PCIe interfaces, such as link 660 in FIG. 6, can be provided over an external connector in some examples.

When connected to a cable or host system via U.2 connector 1615, such as a motherboard or daughterboard of a computer or server system, drive 1605 can provide data storage capacity to the host system. Data can be stored and retrieved from storage media associated with SSDs 1640 and 1641. PCIe switch circuit 1632 is included on circuit board 1630 and provides PCIe interfacing to the host system as well as PCIe fan-out to each individual M.2 SSD and auxiliary PCIe interface. Power control circuity is also included with one or more energy storage arrays to provide holdup power upon loss of power to drive 1605 or removal of drive 1605 from a host. In-flight data or unwritten data can be committed to non-volatile storage media, such as M.2 SSDs 1640 and 1641, upon loss of input power via the holdup power.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A storage drive, comprising:
    a 2.5-inch storage drive form factor chassis that structurally supports elements of the storage drive;
    at least one host connector;
    a plurality of M.2 storage device connectors;
    a Peripheral Component Interconnect Express (PCIe) switch circuit configured to receive storage operations over the at least one host connector and transfer the storage operations for delivery to ones of the plurality of M.2 storage device connectors over associated device PCIe interfaces; and
    power circuitry configured to provide holdup power to ones of the plurality of M.2 storage device connectors after loss of input power over the at least one host connector.

2. The storage drive of claim 1, wherein the at least one host connector comprises a U.2 type storage drive connector.

3. The storage drive of claim 1, comprising:
    a plurality of M.2 storage devices coupled to the plurality of M.2 storage device connectors and configured to store and retrieve data responsive to the storage operations received over the associated device PCIe interfaces.

4. The storage drive of claim 3, comprising:
    responsive to the loss of the input power, the power circuitry configured to remove a corresponding portion of the holdup power from individual ones of the plurality of M.2 storage device connectors responsive to data commit statuses of corresponding M.2 storage devices.

5. The storage drive of claim 1, comprising:
    a circuit assembly comprising the PCIe switch circuit, the plurality of M.2 storage device connectors, the power circuitry, and the at least one host connector.

6. The storage drive of claim 1, wherein the plurality of M.2 storage device connectors comprise four M.2 storage drive connectors, wherein three of the four M.2 storage device connectors are placed on a first side of a circuit assembly, and wherein one of the four M.2 storage device connectors are placed on a second side of the circuit assembly.

7. The storage drive of claim 1, wherein the plurality of M.2 storage device connectors comprise four M.2 storage drive connectors, wherein two of the four M.2 storage device connectors are placed on a first side of a circuit assembly, and wherein two of the four M.2 storage device connectors are placed on a second side of the circuit assembly.

8. The storage drive of claim 1, wherein the at least one host connector comprises two host PCIe interfaces, with at least a first of the two host PCIe interfaces configured to communicatively couple the storage drive to a host system, and wherein at least a second of the two host PCIe interfaces is configured to communicatively couple the storage drive to a further host system.

9. An assembly, comprising:
a 2.5-inch storage drive form factor chassis that structurally supports elements of the storage drive;
a first circuit assembly comprising:
at least one host connector;
a plurality of modular storage drive connectors;
a Peripheral Component Interconnect Express (PCIe) switch circuit configured to receive storage operations over the at least one host connector and transfer the storage operations for delivery to ones of the plurality of modular storage drive connectors over associated device PCIe interfaces; and
control circuitry configured to control holdup power provided to ones of the plurality of modular storage drive connectors after loss of input power over the at least one host connector; and
a second circuit assembly comprising:
holdup capacitors configured to provide the holdup power.

10. The assembly of claim 9, wherein the at least one host connector comprises a U.2 type storage drive connector.

11. The assembly of claim 9, comprising:
a plurality of M.2 storage drives coupled to the plurality of modular storage drive connectors and configured to store and retrieve data responsive to the storage operations received over the associated device PCIe interfaces.

12. The assembly of claim 11, comprising:
responsive to the loss of the input power, the control circuitry configured to remove a corresponding portion of the holdup power from individual ones of the plurality of modular storage drive connectors responsive to data commit statuses of corresponding storage drives.

13. The assembly of claim 9, wherein the plurality of modular storage drive connectors are configured to couple to M.2 storage drives having 80 millimeter lengths or less.

14. The assembly of claim 9, wherein the plurality of modular storage drive connectors comprise four modular storage drive connectors, wherein a three of the four modular storage drive connectors are placed on a first side of the first circuit assembly, and wherein one of the four modular storage drive connectors are placed on a second side of the first circuit assembly.

15. The assembly of claim 9, wherein the plurality of modular storage drive connectors comprise four modular storage drive connectors, wherein two of the four modular storage drive connectors are placed on a first side of the first circuit assembly, and wherein two of the four modular storage drive connectors are placed on a second side of the first circuit assembly.

16. The assembly of claim 9, wherein the at least one host connector comprises two host PCIe interfaces, with at least a first of the two host PCIe interfaces configured to communicatively couple the assembly to a host system, wherein at least a second of the two host PCIe interfaces is configured to communicatively couple the assembly to a further host system.

17. The assembly of claim 9, comprising:
at least one connector configured to couple the first circuit assembly to the second circuit assembly and transfer the holdup power for the first circuit assembly.

18. A 2.5-inch form factor storage drive, comprising:
a U.2 connector configured to carry input power and carry Peripheral Component Interconnect Express (PCIe) communications exchanged with at least one host system;
a first circuit assembly comprising:
four M.2 drive connectors;
a PCIe switch circuit communicatively coupled to U.2 connector and to the four M.2 drive connectors, wherein the PCIe switch circuit is configured to receive over the U.2 connector storage operations transferred by the at least one host system and transfer the operations for delivery to selected ones of the four M.2 drive connectors; and
a second circuit assembly comprising:
holdup capacitors configured to provide holdup power to one or more among the four M.2 drive connectors after the input power has been removed from the U.2 connector.

19. The storage drive of claim 18, further comprising:
one or more M.2 storage devices having a length of 80 millimeter or less coupled to corresponding ones of the four M.2 drive connectors and configured to store and retrieve data responsive to received ones of the storage operations.

20. The storage drive of claim 18, wherein the U.2 connector is further configured to carry communications exchanged with at least a second host system concurrent with the at least one host system.

* * * * *